US012321916B2

(12) United States Patent
Giles et al.

(10) Patent No.: US 12,321,916 B2
(45) Date of Patent: Jun. 3, 2025

(54) RECOMMENDATION OF PAYMENT CREDENTIAL TO BE USED BASED ON MERCHANT INFORMATION

(71) Applicant: APPLE INC., Cupertino, CA (US)

(72) Inventors: Michael Giles, San Jose, CA (US); Craig P. Dooley, Cupertino, CA (US); Anjali S. Sandesara, Cupertino, CA (US); Abuzar Amini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1039 days.

(21) Appl. No.: 14/870,837

(22) Filed: Sep. 30, 2015

(65) Prior Publication Data

US 2016/0092858 A1    Mar. 31, 2016

Related U.S. Application Data

(60) Provisional application No. 62/058,098, filed on Sep. 30, 2014.

(51) Int. Cl.
*G06Q 20/22*     (2012.01)
*G06Q 20/32*     (2012.01)
(Continued)

(52) U.S. Cl.
CPC ....... *G06Q 20/227* (2013.01); *G06Q 20/3224* (2013.01); *G06Q 20/3227* (2013.01);
(Continued)

(58) Field of Classification Search
None
See application file for complete search history.

(56) References Cited

U.S. PATENT DOCUMENTS 5,862,222 A * 1/1999 Gunnarsson ......... B67D 7/0401
340/5.42
7,413,113 B1    8/2008 Zhu
(Continued)

FOREIGN PATENT DOCUMENTS

AU    2011329678 A1 *  7/2013   ............. G06F 3/017
CN    101595505 A   * 12/2009   ............. G06Q 20/02
(Continued)

OTHER PUBLICATIONS

Singh Sumanjeet. Emergence of Payment Systems in the Age of Electronic Commerce: the State of Art. http://globip.com/contents/articles/asiapacific-vol3-article2.pdf (Year: 2009).*
(Continued)

*Primary Examiner* — El Mehdi Oussir
(74) *Attorney, Agent, or Firm* — BAKERHOSTETLER

(57) ABSTRACT

Systems, methods, and computer-readable media for providing a recommendation of a payment credential to be used by an electronic device in a commercial transaction based on merchant information received by the electronic device are provided. In one example embodiment, a method, at an electronic device that includes a secure element that includes at least one payment credential, includes, inter alia, accessing credential availability data indicative of the at least one payment credential, accessing merchant context data associated with a merchant subsystem, wherein the merchant context data is indicative of a preference for a first type of payment credential over a second type of payment credential, and presenting payment recommendation data based on the accessed credential availability data and the accessed merchant context data. Additional embodiments are also provided.

21 Claims, 9 Drawing Sheets

(51) Int. Cl.
*G06Q 20/38* (2012.01)
*G06Q 30/0207* (2023.01)

(52) U.S. Cl.
CPC ....... *G06Q 20/3265* (2020.05); *G06Q 20/327* (2013.01); *G06Q 20/3278* (2013.01); *G06Q 20/382* (2013.01); *G06Q 30/0207* (2013.01)

(56) References Cited

U.S. PATENT DOCUMENTS

| | | | | |
|---|---|---|---|---|
| 7,513,419 B1* | 4/2009 | Crews | ............... | G06Q 20/042 235/379 |
| 8,639,629 B1* | 1/2014 | Hoffman | ............... | G06Q 20/20 705/44 |
| 8,768,838 B1* | 7/2014 | Hoffman | ............... | G06Q 40/00 705/44 |
| 8,851,369 B2* | 10/2014 | Bishop | ............... | G06Q 20/02 235/375 |
| 8,855,556 B2* | 10/2014 | Kitchen | ............... | H04B 5/00 455/41.1 |
| 8,978,975 B2* | 3/2015 | Barnett | ............... | G06Q 20/204 235/380 |
| 9,355,530 B1* | 5/2016 | Block | ............... | G07F 19/201 |
| 9,371,007 B1* | 6/2016 | Penilla | ............... | B60L 11/1848 |
| 9,646,295 B1* | 5/2017 | Kanuganti | ............... | G06Q 20/202 |
| 10,402,818 B2* | 9/2019 | Zarakas | ............... | G06Q 20/354 |
| 2002/0062249 A1* | 5/2002 | Iannacci | ............... | G06Q 20/10 705/14.1 |
| 2006/0178986 A1* | 8/2006 | Giordano | ............... | G06Q 20/20 705/40 |
| 2006/0202012 A1* | 9/2006 | Grano | ............... | G06Q 20/04 235/379 |
| 2008/0172340 A1* | 7/2008 | Karlsson | ............... | G06Q 20/401 705/75 |
| 2010/0082445 A1* | 4/2010 | Hodge | ............... | G06Q 20/20 705/21 |
| 2010/0082490 A1* | 4/2010 | Rosenblatt | ............... | G06Q 20/32 705/64 |
| 2011/0196791 A1* | 8/2011 | Dominguez | ............... | G06Q 20/40 705/44 |
| 2011/0302078 A1* | 12/2011 | Failing | ............... | H02J 7/025 705/39 |
| 2012/0116861 A1* | 5/2012 | Dobyns | ............... | G06Q 30/0236 705/14.34 |
| 2012/0143657 A1* | 6/2012 | Silberberg | ............... | G06Q 30/0207 705/14.1 |
| 2012/0150601 A1* | 6/2012 | Fisher | ............... | G06Q 30/0613 705/14.23 |
| 2012/0173348 A1* | 7/2012 | Yoo | ............... | G06Q 20/10 705/16 |
| 2012/0197691 A1* | 8/2012 | Grigg | ............... | G06Q 20/363 705/14.1 |
| 2012/0215693 A1 | 8/2012 | Faith et al. | | |
| 2012/0265685 A1* | 10/2012 | Brudnicki | ............... | G06Q 30/06 705/44 |
| 2013/0006847 A1* | 1/2013 | Hammad | ............... | G06Q 20/382 705/39 |
| 2013/0073448 A1* | 3/2013 | Wall | ............... | G06Q 20/3278 705/39 |
| 2013/0110709 A1* | 5/2013 | Hodge | ............... | G06Q 20/322 705/39 |
| 2013/0173402 A1* | 7/2013 | Young | ............... | G06Q 30/0635 705/14.73 |
| 2013/0198056 A1* | 8/2013 | Aldrey | ............... | G06Q 30/018 705/38 |
| 2013/0218758 A1* | 8/2013 | Koenigsbrueck | ...... | G06Q 40/02 705/39 |
| 2013/0246258 A1* | 9/2013 | Dessert | ............... | G06Q 20/40 705/41 |
| 2013/0262305 A1* | 10/2013 | Jones | ............... | H04B 5/0031 705/44 |
| 2013/0275309 A1* | 10/2013 | Kwong | ............... | G06Q 20/4012 348/78 |
| 2013/0337789 A1* | 12/2013 | Johnson | ............... | H04W 64/00 455/414.1 |
| 2014/0040139 A1* | 2/2014 | Brudnicki | ............... | G06Q 20/3224 705/44 |
| 2014/0085110 A1* | 3/2014 | Scofield | ............... | G07B 15/04 340/932.2 |
| 2014/0129357 A1* | 5/2014 | Goodwin | ............... | G06Q 30/02 705/16 |
| 2014/0143037 A1* | 5/2014 | Zhou | ............... | G06Q 30/0226 705/14.17 |
| 2014/0149198 A1* | 5/2014 | Kim | ............... | G06Q 20/204 705/14.27 |
| 2014/0164220 A1* | 6/2014 | Desai | ............... | G06Q 20/06 705/39 |
| 2014/0172576 A1* | 6/2014 | Spears | ............... | G06Q 30/0266 705/14.63 |
| 2014/0207682 A1* | 7/2014 | Wolfond | ............... | G06Q 20/322 705/44 |
| 2014/0279309 A1* | 9/2014 | Cowen | ............... | G06Q 40/12 705/30 |
| 2014/0279474 A1* | 9/2014 | Evans | ............... | G06Q 20/3572 705/41 |
| 2014/0279503 A1* | 9/2014 | Bertanzetti | ........ | G06Q 20/3221 705/44 |
| 2014/0298434 A1* | 10/2014 | Prchal | ............... | H04W 12/0609 726/7 |
| 2014/0370863 A1* | 12/2014 | Proctor, Jr. | ........ | G06Q 30/0242 455/414.3 |
| 2015/0006378 A1* | 1/2015 | Blythe | ............... | G06Q 20/3278 705/41 |
| 2015/0073987 A1* | 3/2015 | Dutt | ............... | H04L 63/1408 705/44 |
| 2015/0097037 A1* | 4/2015 | Narendra | ......... | G06K 19/07345 235/488 |
| 2015/0142640 A1* | 5/2015 | Kneen | ............... | G06Q 20/22 705/39 |
| 2015/0149221 A1* | 5/2015 | Tremblay | ............ | B60L 11/1846 705/5 |
| 2015/0180543 A1* | 6/2015 | Verma | ............... | H04B 5/0031 455/41.1 |
| 2015/0248664 A1* | 9/2015 | Makhdumi | ........ | G06Q 20/3274 235/380 |
| 2015/0302411 A1* | 10/2015 | Bondesen | ............. | G06Q 20/20 705/72 |
| 2015/0356563 A1* | 12/2015 | Vohra | ............... | G06Q 20/401 705/44 |
| 2016/0019522 A1* | 1/2016 | Granbery | ............. | G06Q 20/227 705/21 |
| 2016/0042351 A1* | 2/2016 | Syed | ............... | G06Q 20/3221 705/39 |
| 2016/0055512 A1* | 2/2016 | Godsey | ............... | G06Q 20/325 705/14.27 |
| 2016/0162882 A1* | 6/2016 | McClung, III | ....... | G06Q 20/352 705/41 |
| 2016/0321649 A1* | 11/2016 | Dragushan | ........... | G06Q 20/342 |
| 2017/0301046 A1* | 10/2017 | Theobald | ............... | H04W 4/80 |
| 2017/0344991 A1* | 11/2017 | Mark | ............... | G06Q 20/401 |
| 2018/0005217 A1* | 1/2018 | Granbery | ............ | G06Q 20/3278 |

FOREIGN PATENT DOCUMENTS

| | | | | |
|---|---|---|---|---|
| CN | 101960761 | | 1/2011 | |
| CN | 202171839 | | 3/2012 | |
| CN | 103985037 | | 8/2014 | |
| CN | 104040572 | | 9/2014 | |
| CN | 103226783 B | * | 7/2018 | |
| CN | 104106276 B | * | 3/2019 | ............... G06F 3/08 |
| KR | 20060049735 A | * | 2/2005 | |
| KR | 101813256 B1 | * | 12/2017 | ............ G06Q 20/065 |
| TW | 201106286 | | 2/2011 | |
| TW | 201227579 | | 7/2012 | |
| WO | WO-0205232 A2 | * | 1/2002 | ............... G06Q 20/02 |
| WO | 2009/055704 | | 4/2009 | |
| WO | WO-2013012200 A2 | * | 1/2013 | ............... G06Q 20/06 |

(56) References Cited

FOREIGN PATENT DOCUMENTS

| WO | WO-2013106679 A1 * | 7/2013 | ............ G06Q 20/30 |
| WO | WO-2014190333 A1 * | 11/2014 | ....... G06F 17/30554 |
| WO | WO-2018171680 A1 * | 9/2018 | |

OTHER PUBLICATIONS

Chen et al.; Sensor Network Security: A Survey. https://citeseerx.ist.psu.edu/document?repid=rep1&type=pdf&doi=2b4fca1542ef7353606d31351adbccb1ca37cabf (Year: 2009).*

Sumanjeet, "Emergence of payment systems in the age of electronic commerce: The state of art," 2009 First Asian Himalayas International Conference on Internet, Kathmundu, Nepal, 2009. https://ieeexplore.ieee.org/document/5340318?source=IQplus (Year : 2009).*

S. Fong and Z. Yan, "Comparative Study on M-Commerce Applications in Various Scenarios," 2008 IEEE/WIC/ACM International Conference on Web Intelligence and Intelligent Agent Technology, Sydney, NSW, Australia, 2008, pp. 943-946. htttps://ieeexplore.ieee.org/document/4740581?source=IQplus (Year: 2008).*

Decision from European Application No. 15778551.0, dated Sep. 9, 2019, 18 pages.

Taiwanese Office Action dated Oct. 24, 2019, from Taiwanese Application No. 201624367, 19 pages including English language translation.

Chinese Office Action from Chinese Application No. 201580051611.1, dated Mar. 26, 2020, 23 pages including English language translation.

Chinese Office Action from Chinese Application No. 201580051611.1, dated Nov. 26, 2020, 21 pages including English language translation.

Chinese Office Action from Chinese Application No. 201580051611.1, dated Jun. 2, 2011, 12 pages including English language translation.

Chinese Board Opinion from Chinese Patent Application No. 201580051611.1, dated Nov. 15, 2024, 24 pages including English language translation.

* cited by examiner

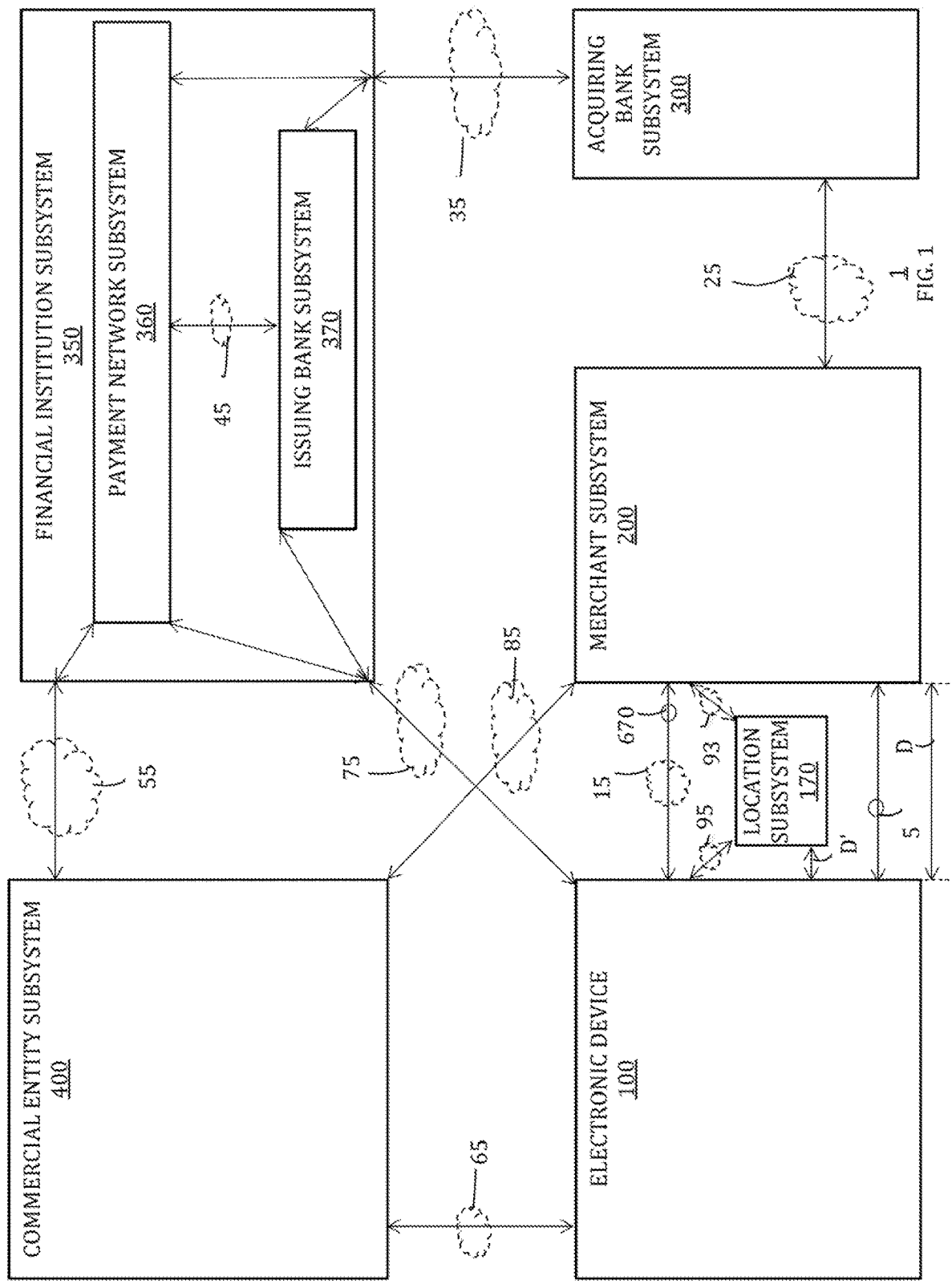

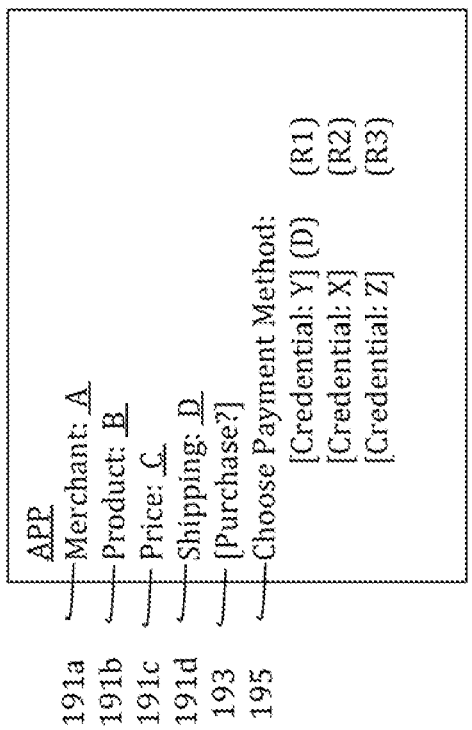

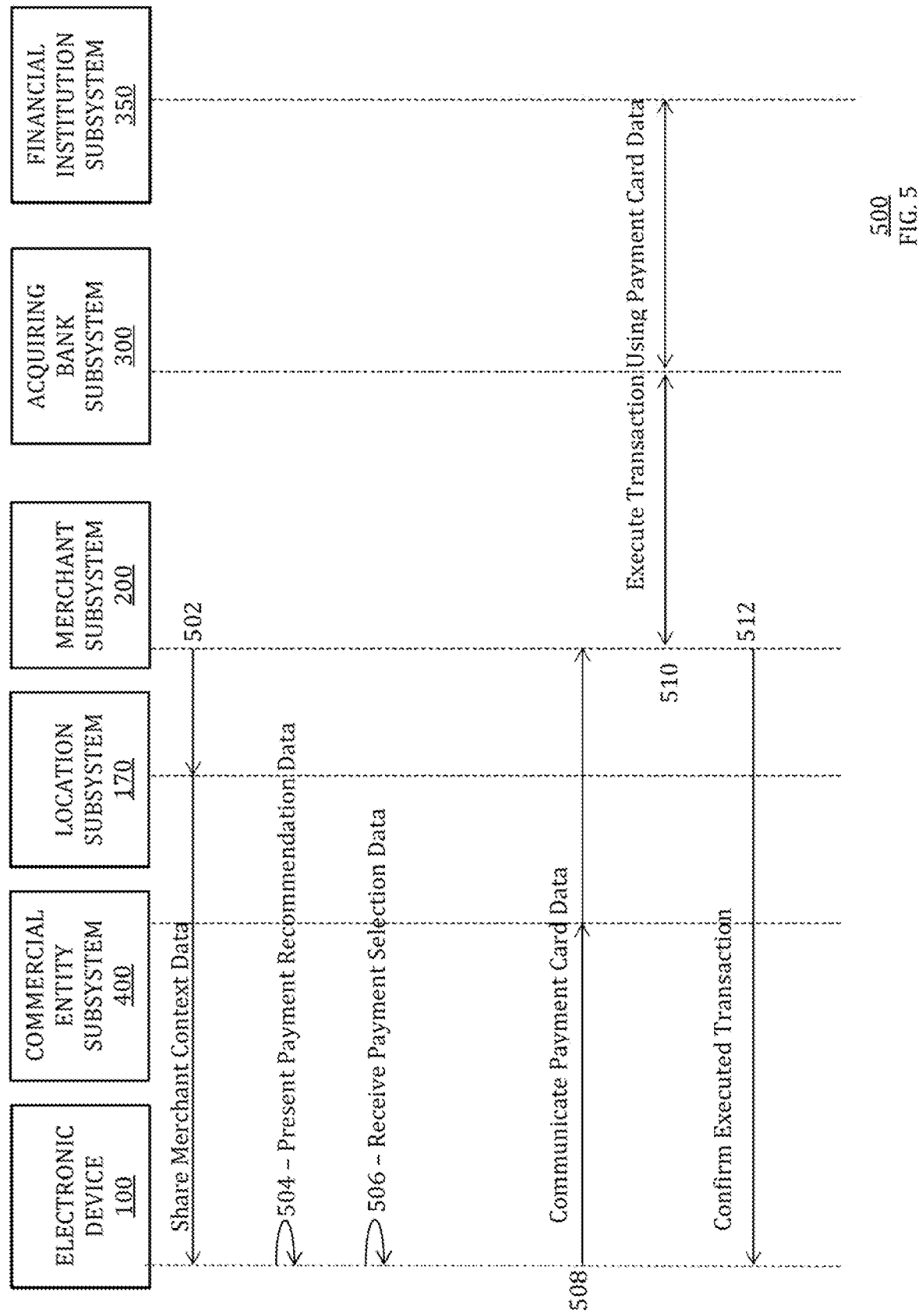

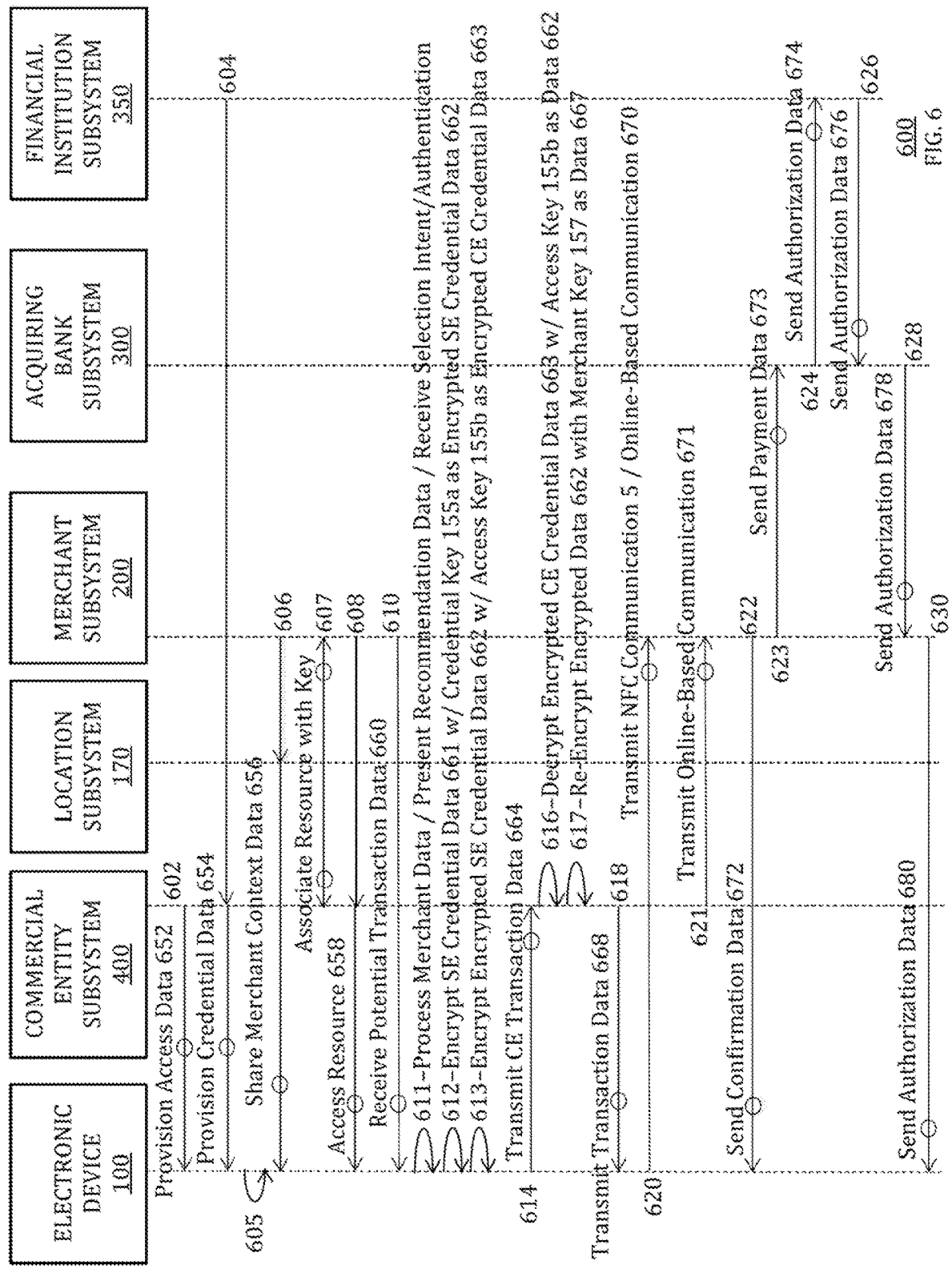

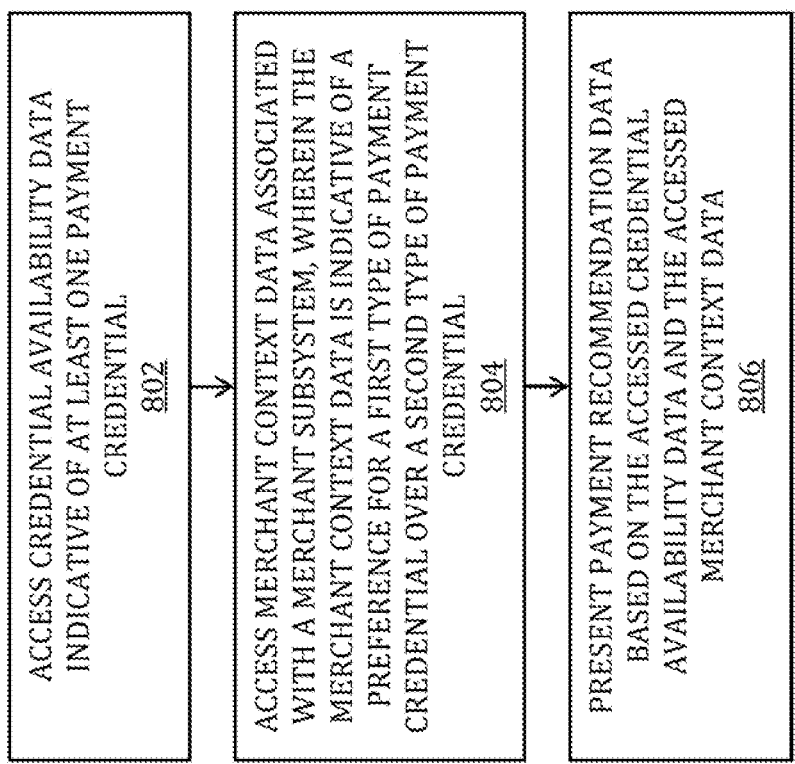
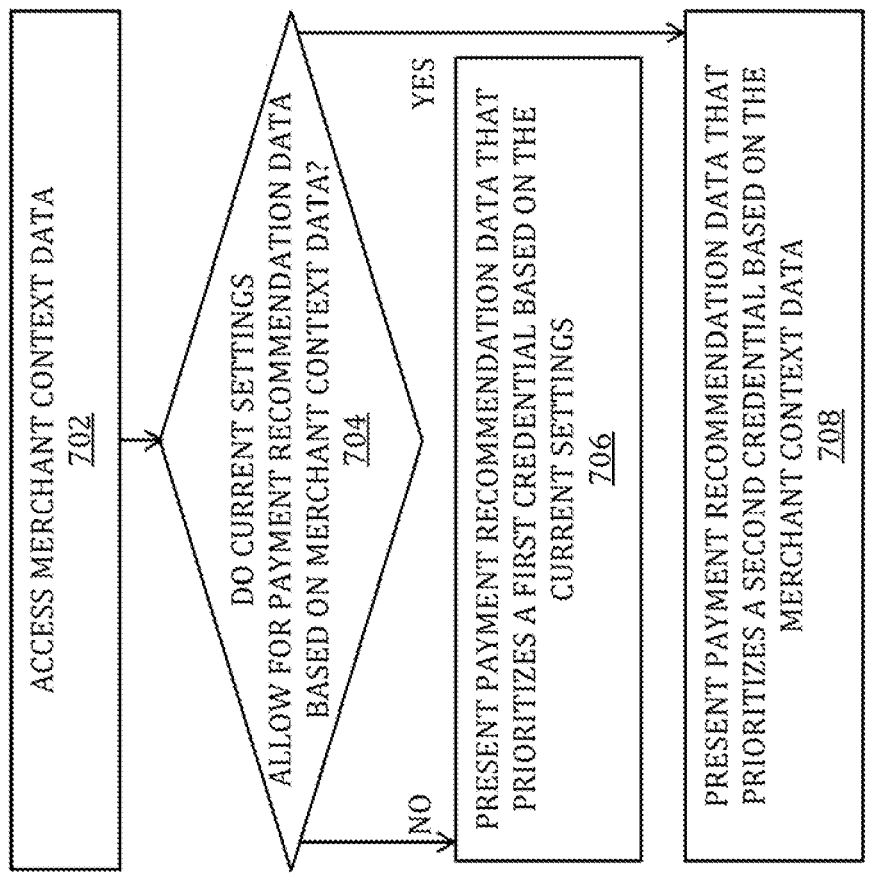

RECOMMENDATION OF PAYMENT CREDENTIAL TO BE USED BASED ON MERCHANT INFORMATION

CROSS-REFERENCE TO RELATED APPLICATION(S)

This application claims the benefit of prior filed U.S. Provisional Patent Application No. 62/058,098, filed Sep. 30, 2014, which is hereby incorporated by reference herein in its entirety.

TECHNICAL FIELD

This disclosure relates to providing a recommendation of a payment credential to be used by an electronic device in a commercial transaction based on merchant information received by the electronic device.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a payment or commerce credential, such as a credit card credential, with the other entity in a contactless proximity-based communication. However, selection from amongst various commerce credentials for use in a transaction has often been inefficient.

SUMMARY OF THE DISCLOSURE

This document describes systems, methods, and computer-readable media for providing a recommendation of a payment credential to be used by an electronic device in a commercial transaction based on merchant information received by the electronic device.

As an example, a method may include, at an electronic device including a secure element that includes at least one payment credential, accessing credential availability data indicative of the at least one payment credential, accessing merchant context data associated with a merchant subsystem, wherein the merchant context data is indicative of a preference for a first type of payment credential over a second type of payment credential, and presenting payment recommendation data based on the accessed credential availability data and the accessed merchant context data.

As another example, an electronic device may include a communications component configured to receive merchant context data from a merchant subsystem, a secure element configured to store credential data for at least one payment credential and generate credential availability data indicative of each payment credential of the at least one payment credential, an application processor configured to generate payment recommendation data based on the merchant context data from the communications component and the credential availability data from the secure element, and an output component configured to present the payment recommendation data to a user of the electronic device, wherein the payment recommendation data includes information describing a benefit of using a particular payment credential.

As yet another example, a non-transitory computer-readable medium may include computer-readable instructions recorded thereon for accessing at an electronic device credential availability data indicative of the at least one payment credential, accessing at the electronic device merchant context data associated with a merchant subsystem, wherein the merchant context data is indicative of a preference for a first type of payment credential over a second type of payment credential, and presenting at the electronic device payment recommendation data based on the accessed credential availability data and the accessed merchant context data.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1 is a schematic view of an illustrative system for recommending a payment credential of an electronic device;

FIGS. 4A-4C are front views of screens of a graphical user interface of the electronic device of FIGS. 1-4 illustrating processes for recommending payment credentials; and FIGS. 5-8 are flowcharts of illustrative processes for recommending payment credentials.

DETAILED DESCRIPTION OF THE DISCLOSURE

Figure 1A:
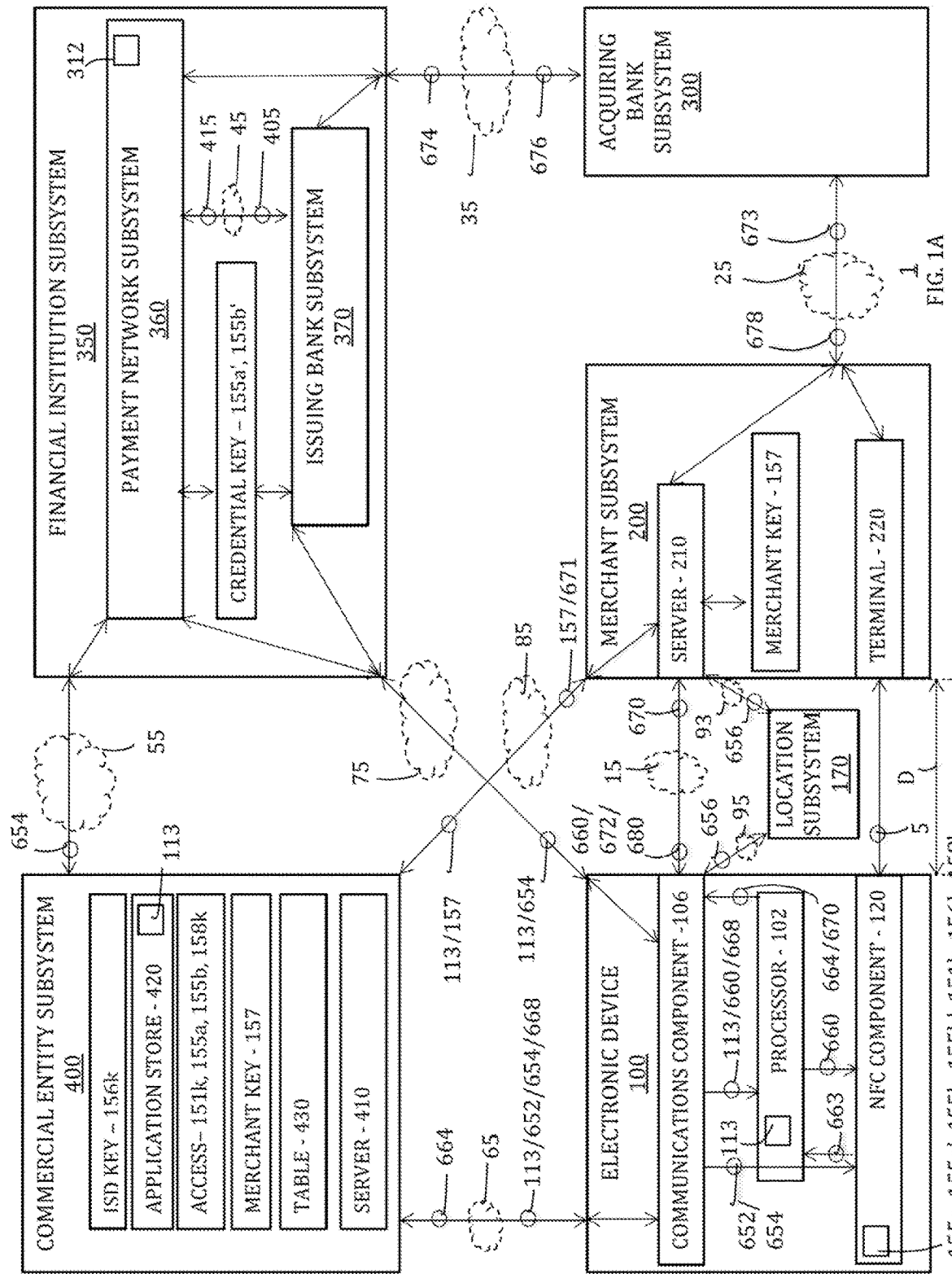
FIG. 1A is another more detailed schematic view of the system of FIG. 1.
Figure 2:
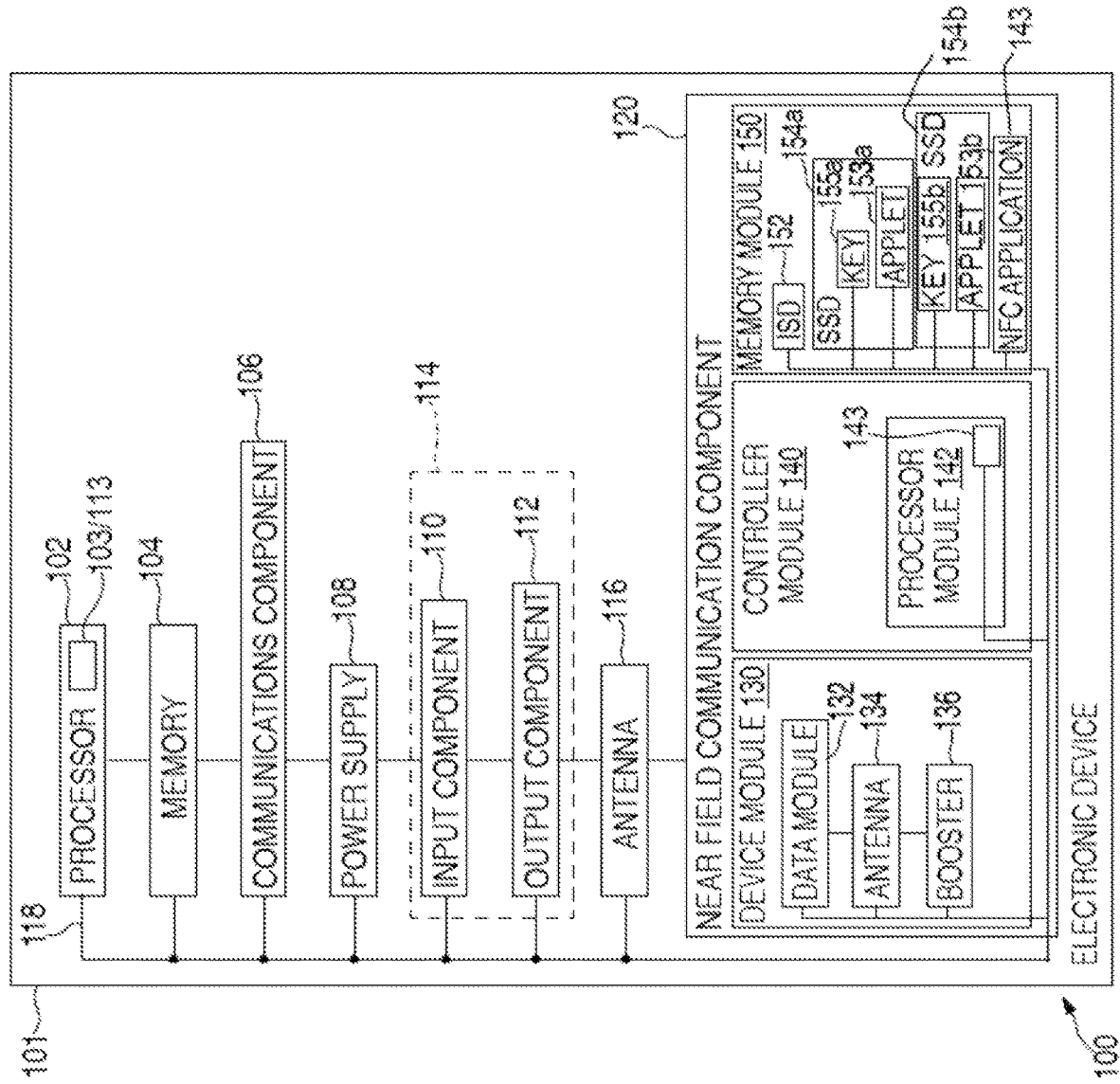
FIG. 2 is a more detailed schematic view of the electronic device of the system of FIGS. 1 and 1A.
Figure 3:
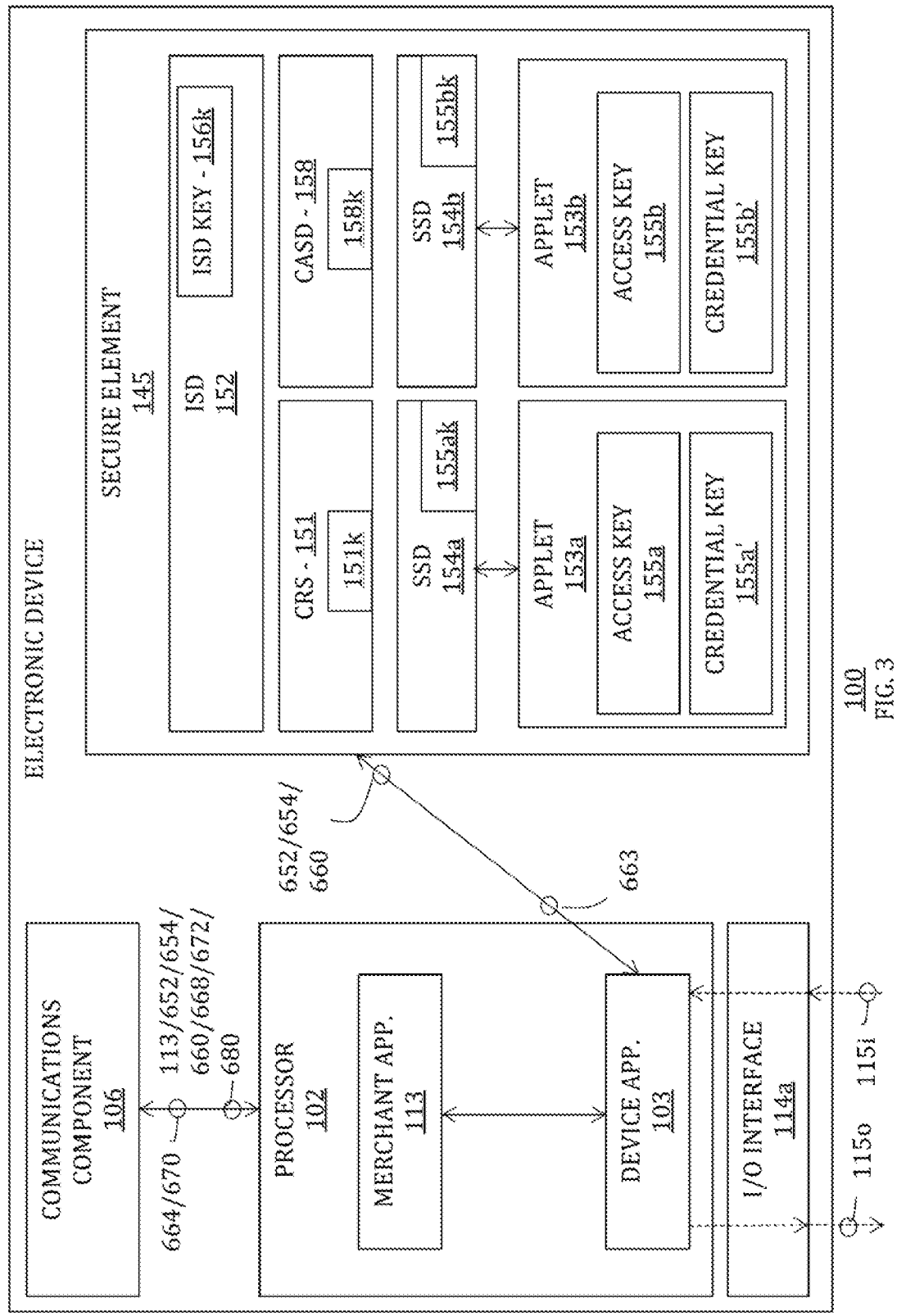
FIG. 3 is another more detailed schematic view of the electronic device of FIGS. 1-2.
Figure 4:
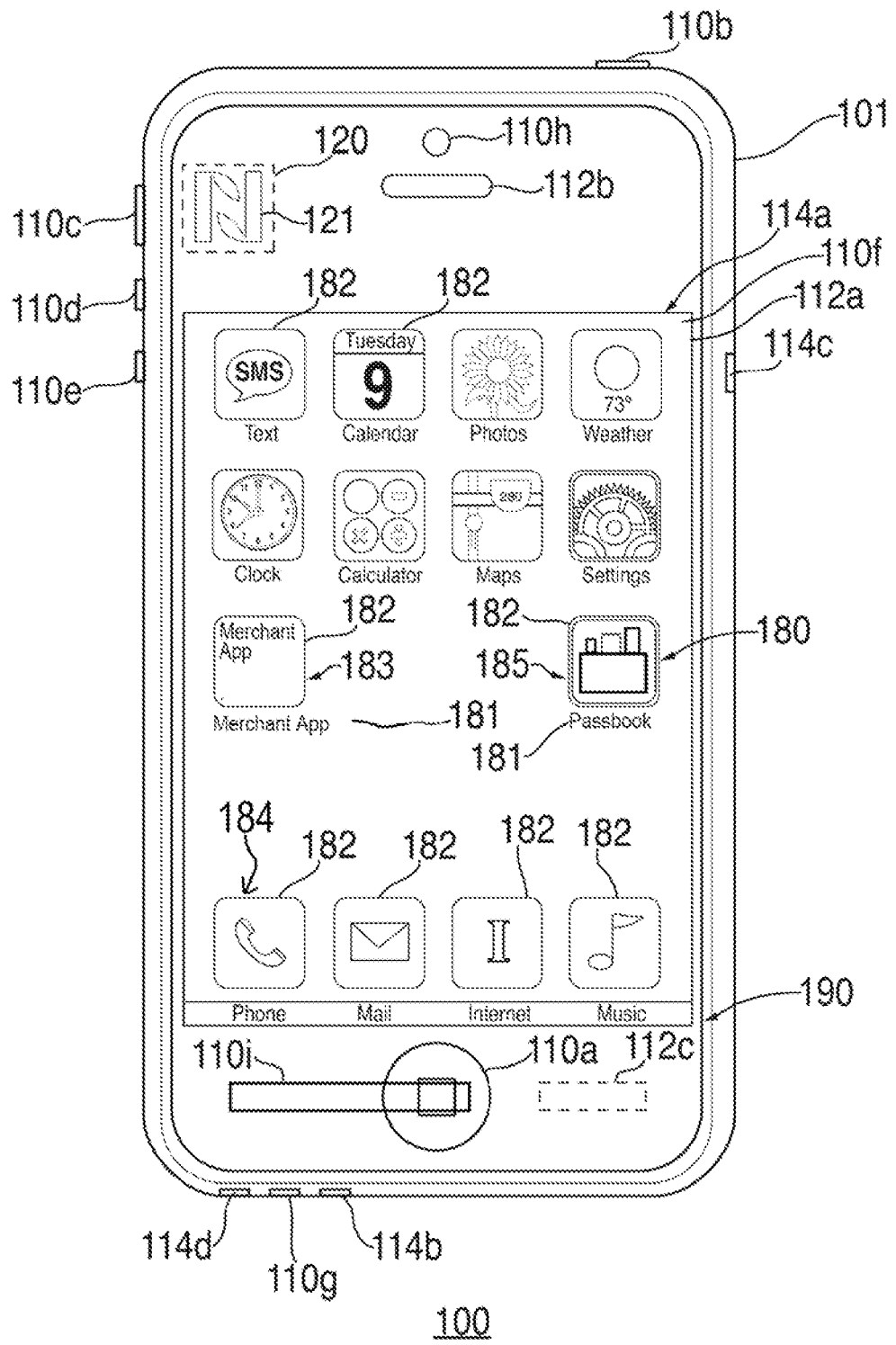
FIG. 4 is a front view of the electronic device of FIGS. 1-3.

FIGS. 1 and 1A show a system 1 in which one or more credentials may be provisioned onto an electronic device 100 from a financial institution subsystem 350 in conjunction with a commercial entity subsystem 400, and in which such credentials may be used by electronic device 100 for conducting a financial transaction with a merchant subsystem 200, location subsystem 170, and an associated acquiring bank subsystem 300. FIGS. 2-4 show further details with respect to particular embodiments of electronic device 100 of system 1, FIGS. 4A-4C show example screens 190*a*-190*c* that may be representative of a graphical user interface of electronic device 100 during a financial transaction, while FIGS. 5-8 are flowcharts of illustrative processes for recommending a payment credential to be used in a financial transaction.

Description of FIG. 1

FIG. 1 is a schematic view of an illustrative system 1 that may allow for the recommendation of a payment credential to be used by an electronic device in a commercial transaction (e.g., an NFC or online payment). For example, as shown in FIG. 1, system 1 may include an end-user electronic device 100 as well as a commercial entity subsystem 400 and a financial institution subsystem 350 for securely provisioning one or more credentials on electronic device 100. Moreover, as shown in FIG. 1, system 1 may also include a location subsystem 170 for providing location-based payment information to electronic device 100, as well as a merchant subsystem 200 for receiving contactless proximity-based communications 5 (e.g., near field communications) and/or online-based communications 670 (e.g., in-app network telecommunications) from electronic device 100 for enabling payments based on such provisioned credentials between a user of electronic device 100 and a merchant of merchant subsystem 200. System 1 may also include an acquiring bank subsystem 300 that may utilize such contactless proximity-based communications 5 and/or such online-based communications 670 for completing a financial transaction with financial institution subsystem 350.

System 1 may include a communications path 15 for enabling communication between device 100 and merchant subsystem 200, a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, a communications path 75 for enabling communication between financial institution subsystem 350 and electronic device 100, a communications path 85 for enabling communication between commercial entity subsystem 400 and merchant subsystem 200, a communications path 93 for enabling communication between merchant subsystem 200 and location subsystem 170, and a communications path 95 for enabling communication between location subsystem 170 and electronic device 100. One or more of paths 15, 25, 35, 45, 55, 65, 75, 85, 93, and 95 may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of paths 15, 25, 35, 45, 55, 65, 75, 85, 93, and 95, which may be capable of providing communications using any suitable wired or wireless communications protocol. For example, one or more of paths 15, 25, 35, 45, 55, 65, 75, 85, 93, and 95 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include a secure element that may be configured to provide a tamper-resistant platform (e.g., as a single or multiple chip secure microcontroller) that may be capable of securely hosting applications and their confidential and cryptographic data (e.g., credential applets and associated credential keys, such as a credential key 155a' and an access key 155a, and/or an issuer security domain ("ISD") key 156k, as shown in FIG. 1A) in accordance with rules and security requirements that may be set forth by a set of well-identified trusted authorities (e.g., an authority of financial institution subsystem and/or an industry standard, such as GlobalPlatform). As described below in more detail, a credential applet of NFC component 120 may be configured to provide sufficient detail for identifying a funding account or other financial instrument or credit source, where such a credential applet may be used by electronic device 100 in one or more communications with merchant subsystem 200 for facilitating a financial transaction. NFC component 120 may be configured to communicate such credential information as a contactless proximity-based communication 5 (e.g., near field communication) with merchant subsystem 200 (e.g., with a merchant terminal 220 of merchant subsystem 200, where merchant terminal 220 may be located at a brick and mortar store or any physical location at which a user of electronic device 100 may use a credential stored on electronic device 100 to conduct a financial transaction with a proximately located merchant terminal 220 via a contactless proximity-based communication 5). Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 15, 65, and/or 75). Processor 102 of electronic device 100 may include any processing circuitry that may be operative to control the operations and performance of one or more components of electronic device 100. For example, processor 102 may be configured to run one or more applications on device 100 (e.g., device application 103 or online resource or merchant application 113) that may at least partially dictate the way in which online-based communications 670 including credential information of NFC component 120 may be communicated between communications component 106 of device 100 and a merchant server 210 of merchant subsystem 200 (e.g., to conduct a financial transaction with a remote merchant server of merchant subsystem 200 over the internet or any other suitable network that may be provided by communications path 15).

Merchant server 210 of merchant subsystem 200 of FIG. 1A may include any suitable component or subsystem configured to receive an online-based communication 670 from communications component 106 of electronic device 100 via a communication path 15 between device 100 and server 210. Such an online-based communication 670 may be configured to communicate commerce credential data from a secure element of NFC component 120 of device 100 (e.g., credit card credential information from an enabled applet of a credential supplemental security domain ("SSD"), as described in more detail below) to server 210 via any suitable communications protocol supported by communications component 106 of device 100 (e.g., Wi-Fi, Bluetooth™, cellular, wired network protocols, etc.). Online-based communication 670 may be provided within any suitable online-context, such as when a user of device 100 is communicating with merchant server 210 to conduct a financial transaction via a third party application 113 running on device 100 that may be managed by merchant server 210 or via an internet application or web browser (e.g., Safari™ by Apple Inc.) running on device 100 that may be pointed to a uniform resource locator ("URL") whose target or web resource may be managed by merchant server 210. Accordingly, it is noted that online-based communication 670 between merchant server 210 and electronic device 100 may occur wirelessly and/or via wired paths (e.g., over the internet). Merchant server 210 may be provided by a merchant of merchant subsystem 200 (e.g., as a webserver to host website data and/or manage third party application data). Although not shown, merchant subsystem 200 may also include a merchant processor component that may be the same as or similar to a processor component 102 of electronic device 100, a merchant communications component that may be the same as or similar to a communications component 106 of electronic device 100, a merchant I/O interface that may be the same as or similar to an I/O interface 114 of electronic device 100, a merchant bus that may be the same as or similar to a bus 118 of electronic device 100, a merchant memory component that may be the same as or similar to a memory component 104 of electronic device 100, and/or a merchant power supply component that may be the same as or similar to a power supply component 108 of electronic device 100.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 may be associated with a specific payment card that may be electronically linked to an account or accounts of a particular user. Various types of payment cards are suitable, including credit cards, debit cards, charge cards, stored-value cards, fleet cards, gift cards, and the like. The commerce credential of a specific payment card may be provisioned on electronic device 100 (e.g., as a credential of a credential supplemental security domain of NFC component 120, as described below) by issuing bank subsystem 370 for use in a commerce credential data communication (e.g., a contactless proximity-based communication 5 and/or an online-based communication 670) with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand.

In order for a financial transaction to occur within system 1, at least one commerce credential must be securely provisioned on a secure element of NFC component 120 of electronic device 100. For example, such a commerce credential may be at least partially provisioned on a secure element of NFC component 120 of electronic device 100 directly from financial institution subsystem 350 (e.g., as credential data 654 via a communication path 75 between financial institution subsystem 350 and device 100, which may be passed to NFC component 120 via communications component 106). Additionally or alternatively, such a commerce credential may be at least partially provisioned on a secure element of NFC component 120 of electronic device 100 from financial institution subsystem 350 via commercial entity subsystem 400 (e.g., as credential data 654 via a communication path 55 between financial institution subsystem 350 and commercial entity subsystem 400, which may be passed to device 100 as credential data 654 via a communication path 65 between a server 410 of commercial entity subsystem 400 and communications component 106 of device 100, which may then be passed to NFC component 120 from communications component 106). Credential data 654 via path 75 and/or via path 65 may be provisioned on a secure element of device 100 as at least a portion or all of a credential supplemental security domain of NFC component 120 and may include a credential applet and/or a credential key, such as credential key 155a'. As shown in FIG. 1A, for example, financial institution subsystem 350 may also have access to credential key 155a' (e.g., for decrypting data encrypted by device 100 using credential key 155a'). Financial institution subsystem 350 may be responsible for management of credential key 155a', which may include the generation, exchange, storage, use, and replacement of such a key. Financial institution subsystem 350 may store its version of credential key 155a' in a secure element of financial institution subsystem 350.

Commercial entity subsystem 400 may be provided as an intermediary between electronic device 100 and financial institution subsystem 350, where commercial entity subsystem 400 may be configured to provide a new layer of security and/or to provide a more seamless user experience when a credential is being provisioned on a secure element of device 100 and/or when such a provisioned credential is being used as part of a commerce credential data communication (e.g., as part of an online-based communication 670) between device 100 and merchant subsystem 200. Commercial entity subsystem 400 may be provided by a specific commercial entity that may offer various services to a user of device 100 via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, or the like) and/or of an operating system (e.g., device application 103) of device 100. The commercial entity that may provide commercial entity subsystem 400 (e.g., Apple Inc.) may be distinct and independent from any financial entity of financial institution subsystem 350. For example, the commercial entity that may provide commercial entity subsystem 400 may be distinct and independent from any payment network subsystem 360 or issuing bank subsystem 370 that may furnish and manage any credit card or other commerce credential to be provisioned on user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and independent from any merchant of merchant subsystem 200 that may provide a merchant terminal for NFC communications, a third party application 113, and/or any other aspect of merchant subsystem 200. Such a commercial entity may leverage its potential ability to configure or control various components of device 100 (e.g., software and/or hardware components of device 100 when that commercial entity at least partially produces or manages device 100) in order to provide a more seamless user experience for a user of device 100 when he or she wants to provision a credential offered by financial institution subsystem 350 on user device 100 and/or when such a provisioned credential is being used as part of a commerce credential data communication with merchant subsystem 200 (e.g., as part of communication 5 or communication 670). For example, in some embodiments, device 100 may be configured to communicate with commercial entity subsystem 400 seamlessly and transparently to a user of device 100 (e.g., via communications path 65) for sharing or receiving certain data that may enable a higher level of security (e.g., during an online-based commerce credential data communication between device 100 and merchant subsystem 200). Although not shown, commercial entity subsystem 400 may also include a processor component that may be the same as or similar to a processor component 102 of electronic device 100, a communications component that may be the same as or similar to a communications component 106 of electronic device 100, an I/O interface that may be the same as or similar to an I/O interface 114 of electronic device 100, a bus that may be the same as or similar to a bus 118 of electronic device 100, a memory component that may be the same as or similar to a memory component 104 of electronic device 100, and/or a power supply component that may be the same as or similar to a power supply component 108 of electronic device 100, one, some, or all of which may be at least partially provided by server 410, for example.

In addition to at least one commerce credential being provisioned on a secure element of NFC component 120 of electronic device 100 (e.g., as a portion of a credential SSD with credential key 155a'), at least one access SSD with an access key 155b may also be provisioned on the secure element of NFC component 120 of device 100 in order to more securely enable device 100 to conduct a financial transaction with merchant subsystem 200. For example, an access SSD may be at least partially provisioned on a secure element of NFC component 120 of electronic device 100 directly from commercial entity subsystem 400 (e.g., as access data 652 via communication path 65 between server 410 of commercial entity subsystem 400 and communications component 106 of device 100, which may then be passed to NFC component 120 from communications component 106). Access data 652 via path 65 may be provisioned on a secure element of device 100 as at least a portion or all of an access SSD and may include an access applet and/or access key 155b. As shown in FIG. 1A, commercial entity subsystem 400 may also have access to access key 155b (e.g., for decrypting data encrypted by device 100 using access key 155b). Commercial entity subsystem 400 may be responsible for management of access key 155b, which may include the generation, exchange, storage, use, and replacement of such a key. Commercial entity subsystem 400 may store its version of access key 155b in a secure element of commercial entity subsystem 400. An access SSD of NFC component 120 with access key 155b may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a credential of a credential SSD of NFC component 120). By storing such an access SSD within a secure element of device 100, its ability to reliably determine user intent for and authentication of a financial transaction may be increased. Moreover, as described in more detail below, access key 155b of such an access SSD of NFC component 120 may be leveraged to provide increased encryption to financial transaction data that may be communicated outside of the secure element of device 100. Additionally or alternatively, as described below, access data 652 may include an issuer security domain ("ISD") key 156k for an ISD of the secure element of electronic device 100, which may also be maintained by commercial entity subsystem 400, and may be used in addition to or as an alternative to access key 155b as described below.

As mentioned, in addition to at least one credential SSD and at least one access SSD being provisioned on a secure element of electronic device 100, at least one third party application (e.g., application 113) may be accessed by device 100 in order to enable a commerce credential data communication (e.g., communication 5 or an online-based communication 670) between device 100 and merchant subsystem 200. First, such an application 113 may be approved or otherwise enabled by commercial entity subsystem 400 before application 113 may be accessible by device 100. For example, an application store 420 of commercial entity subsystem 400 (e.g., the Apple App Store™) may receive at least some date representative of application 113 from merchant subsystem 200 via communication path 85. Moreover, in some embodiments, commercial entity subsystem 400 may generate or otherwise assign a merchant key 157 for application 113 and provide such a merchant key 157 to merchant subsystem 200 (e.g., via path 85). Alternatively, merchant subsystem 200 may generate or otherwise assign a merchant key 157 for application 113 and provide such a merchant key 157 to commercial entity subsystem 400 (e.g., via path 85). Either merchant subsystem 200 or commercial entity subsystem 400 may be responsible for management of merchant key 157, which may include the generation, exchange, storage, use, and replacement of such a key. No matter how or where such a merchant key 157 is generated and managed, both merchant subsystem 200 and commercial entity subsystem 400 may store a version of merchant key 157 (e.g., in a respective secure element of merchant subsystem 200 and commercial entity subsystem 400). In some embodiments, such a merchant key 157 may be specifically associated with merchant application 113, while, in other embodiments, merchant key 157 may be specifically associated with a merchant of merchant subsystem 200 such that merchant key 157 may be associated with multiple third party applications operated by the same merchant of merchant subsystem 200. A table 430 or any other suitable data structure or source of information accessible to commercial entity subsystem 400 may be provided for associating a particular merchant key 157 with a particular merchant application 113 or merchant entity. Table 430 may enable commercial entity subsystem 400 to determine and utilize an appropriate merchant key 157 for providing a layer of security to a commerce credential data communication (e.g., an online-based communication 670) between device 100 and merchant subsystem 200 (e.g., when a user of device 100 is communicating with merchant server 210 to conduct a financial transaction via a third party application 113 associated with that merchant key 157), as described in more detail below. Device 100 may be configured to access application 113 (e.g., from application store 420 via communication path 65) and run application 113 (e.g., with processor 102). Alternatively or additionally, a merchant key 157 may be associated with a merchant's website (e.g., one or more URLs) rather than or in addition to a merchant's third party application (e.g., application 113). For example, a merchant of merchant subsystem 200 may work with commercial entity subsystem 400 to associate a particular merchant website with a particular merchant key 157 within table 430, which may enable commercial entity subsystem 400 to determine and utilize an appropriate merchant key 157 for providing a layer of security to a commerce credential data communication (e.g., an online-based communication 670) between device 100 and merchant subsystem 200 (e.g., when a user of device 100 is communicating with merchant server 210 to conduct a financial transaction via an internet application or web browser running on device 100 that may be pointed to a URL whose target or web resource may be associated with that merchant key 157). Device 100 may be configured to access such a URL, for example, from merchant server 210 via communication path 15 using an internet application on device 100.

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application (e.g., an application associated with a merchant of merchant subsystem 200).

NFC component 120 may be any suitable proximity-based communication mechanism that may enable contactless proximity-based transactions or communications 5 between electronic device 100 and merchant terminal 220 (e.g., a merchant payment terminal) of merchant subsystem 200. NFC component 120 may include any suitable modules for enabling contactless proximity-based communication 5 between electronic device 100 and merchant terminal 220. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a merchant terminal as part of a contactless proximity-based or NFC communication. Additionally or alternatively, NFC data module 132 may be configured to contain, route, or otherwise receive any suitable data that may be received by NFC component 120 from a merchant terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a merchant terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and merchant subsystem 200. NFC memory module 150 may be tamper resistant and may provide at least a portion of a secure element 145 (see, e.g., FIG. 3). For example, such a secure element may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A credential may include credential data that may be assigned to a user/consumer and that may be stored securely on electronic device 100, such as a credit card payment number. NFC memory module 150 may include at least two SSDs 154 (e.g., at least a first SSD 154a and a second SSD 154b). For example, first SSD 154a (e.g., a credential SSD 154a) may be associated with a specific credential (e.g., a specific credit card credential or a specific public transit card credential provisioned by financial institution subsystem 350) that may provide specific privileges or payment rights to electronic device 100, while second SSD 154b (e.g., an access SSD 154b) may be associated with a commercial entity (e.g., commercial entity of commercial entity subsystem 400, which may be a controlling entity for device 100) that may control access of device 100 to a specific credential of another SSD (e.g., first SSD 154a), for example, to provide specific privileges or payment rights to electronic device 100. Alternatively, each one of first SSD 154a and second SSD 154b may be associated with a respective specific credential (e.g., a specific credit card credential or a specific public transit card credential provisioned by financial institution subsystem 350) that may provide specific privileges or payment rights to electronic device 100. Each SSD 154 may include and/or be associated with at least one applet 153 (e.g., SSD 154a with applet 153a and SSD 154b with applet 153b). For example, an applet 153 of an SSD 154 may be an application that may run on a secure element of NFC component 120 (e.g., in a GlobalPlatform environment). Each applet 153 may also include and/or be associated with at least one of its own keys 155 (e.g., applet 153a with at least one key 155a and applet 153b with at least one key 155b).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. Each key and applet may be loaded on the secure element of device 100 by a TSM or an authorized agent or pre-loaded on the secure element when first provided on device 100. As one example, while credential SSD 154a may be associated with a particular credit card credential, that particular credential may only be communicated as a commerce credential data communication to merchant subsystem 200 (e.g., as a contactless proximity-based communication 5 to merchant terminal 220 and/or as an online-based communication 670 to a merchant server 210) from a secure element of device 100 (e.g., from NFC component 120) for a financial transaction when applet 153a of that credential SSD 154a has been enabled or otherwise activated or unlocked for such use.

Security features may be provided for enabling use of NFC component 120 that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area. As an example, an access SSD 154b may leverage applet 153b to determine whether such authentication has occurred before allowing other SSDs 154 (e.g., a credential SSD 154a) to be used for communicating its credential information. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, applet 153b of access SSD 154b may be configured to determine intent and local authentication of a user of device 100 (e.g., via one or more input components 110, such as a biometric input component) and, in response to such a determination, may be configured to enable another particular SSD for conducting a payment transaction (e.g., with a credential of credential SSD 154a).

Description of FIG. 3

Referring now to FIG. 3, FIG. 3 shows another detailed view of a portion of electronic device 100 of system 1 described above with respect to FIGS. 1-2. As shown in FIG. 3, for example, a secure element 145 of NFC component 120 may include SSD 154a, which may include or be associated with applet 153a, which may include an access key 155a and/or a credential key 155a', and SSD 154b, which may include or be associated with applet 153b, which may include an access key 155b and/or a credential key 155b'. In some embodiments, a specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key 155 (e.g., a respective one of keys 155ak and 155bk) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153a of SSD 154a may be associated with a first commerce credential and credential applet 153b of SSD 154b may be associated with a second commerce credential), where a credential applet may have its own access key (e.g., access key 155a for credential applet 153a and access key 155b for credential applet 153b) and/or its own credential key (e.g., credential key 155a' for credential applet 153a and credential key 155b' for credential applet 153b), and where a credential applet may need to be activated to enable its associated commerce credential for use by NFC device module 130 as an NFC communication 5 and/or as an online-based communications 670 between electronic device 100 and merchant subsystem 200. In some embodiments, a credential key of a credential applet (e.g., credential key 155a' for credential applet 153a and/or credential key 155b' for credential applet 153b) may be generated by financial institution subsystem 350 that may be responsible for such a credential and may be accessible by that financial institution subsystem 350 (e.g., as shown in FIG. 1A) for enabling secure transmission of that credential applet between secure element 145 and financial institution subsystem 350. Additionally or alternatively, an access key of a credential applet (e.g., access key 155a for credential applet 153a and/or access key 155b for credential applet 153b) may be generated by commercial entity subsystem 400 and may be accessible by commercial entity subsystem 400 (e.g., as shown in FIG. 1A) for enabling secure transmission of that credential applet between secure element 145 and commercial entity subsystem 400.

Additionally or alternatively, as shown in FIG. 3, secure element 145 may include ISD 152, which may include an ISD key 156k that may also be known to a trusted service manager associated with that security domain (e.g., commercial entity subsystem 400, as shown in FIG. 1A). ISD key 156k may be leveraged by commercial entity subsystem 400 and electronic device 100 similarly to and/or instead of access key 155a and/or access key 155b for enabling secure transmissions between commercial entity subsystem 400 and secure element 145 of electronic device 100. Moreover, as shown in FIG. 3, and as described below in more detail, various data may be communicated between processor 102 and secure element 145. For example, processor 102 of device 100 may be configured to run a device application 103 that may communicate information with a merchant application 113 of processor 102 as well as secure element 145, an I/O component 114a (e.g., for receiving I/O input data 115i and/or for transmitting I/O output data 115o), and/or communications component 106.

Additionally or alternatively, as shown in FIG. 3, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it cannot be inspected or modified by any entity, including an issuer of secure element 145. CASD 158 may be configured to include and/or may be configured to generate and/or otherwise include CASD access kit 158k (e.g., a CASD private key ("CASD-SK"), a CASD public key ("CASD-PK"), a CASD certificate ("CASD-Cert."), and/or a CASD-signing module). For example, CASD 158 may be configured to sign certain data on secure element 145 (e.g., using CASD access kit 158k) before providing such data to another portion of device 100 (e.g., communications component 106 for sharing with other subsystems of system 1). As an example, CASD 158 may be configured to sign any data that is provided by secure element 145 such that other subsystems (e.g., commercial entity subsystem 400) may be able to confirm that such signed data was signed by secure element 145 (e.g., using an associated CASD kit 158k at commercial entity subsystem 400).

Additionally or alternatively, as shown in FIG. 3, secure element 145 may include a contactless registry services ("CRS") applet or application 151 that may be configured to provide local functionality to electronic device 100 for modifying a life cycle state (e.g., activated, deactivated, locked, etc.) of certain security domain elements and sharing certain output information 115o about certain security domain elements in certain life cycle states with a user of device 100 (e.g., via a user I/O interface 114a). Additionally or alternatively, CRS 151 may include a CRS access key 151k that may also be known to a trusted service manager associated with CRS 151 (e.g., commercial entity subsystem 400, as shown in FIG. 1A). CRS access key 151k may be leveraged by commercial entity subsystem 400 and electronic device 100 similarly to and/or instead of access key 155a and/or access key 155b for enabling secure transmissions between commercial entity subsystem 400 and secure element 145 of electronic device 100.

Description of FIG. 4

As shown in FIG. 4, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific third party merchant application (e.g., application 113) and may display screens of a specific user interface that may include one or more tools or features for interacting with device 100 in a specific manner. As another example, when the specific icon 182 labeled with a "Passbook" textual indicator 181 (i.e., specific icon 185) is selected, device 100 may launch or otherwise access a specific device application (e.g., as a "wallet" or "Passbook" application 103 for managing various credentials on secure element 145) and may display screens of a specific user interface that may include one or more tools or features for interacting with device 100 in a specific manner. For example, FIGS. 4A-4C may show specific examples of such displays of GUI 180 during use of a merchant application (e.g., application 113) and/or a passbook application (e.g., application 103) that may be used by a user of device 100 for making a payment with a credential of NFC component 120 (e.g., a credential of credential SSD 154a), via a communication 5 and/or a communication 670). For each application, screens may be displayed on display output component 112a and may include various user interface elements. Additionally or alternatively, for each application, various other types of non-visual information may be provided to a user via various other output components 112 of device 100.

Description of FIGS. 4A-4C, FIG. 5, and FIG. 6

To facilitate the following discussion regarding the operation of system 1 for recommending payment credentials, reference is made to one or more processes of one or more flowcharts of FIGS. 5 and 6, to various components of system 1 of the schematic diagrams of FIGS. 1-4, and to front views of screens 190-190c that may be representative of a graphical user interface of electronic device 100 during such a payment (e.g., as shown in FIGS. 4-4C). The operation described may be achieved with a wide variety of graphical elements and visual schemes. Therefore, the embodiments of FIGS. 4-4C are not intended to be limited to the precise user interface conventions adopted herein. Rather, embodiments may include a wide variety of user interface styles.

FIG. 5 is a flowchart of an illustrative process 500 for recommending payment credentials. Process 500 is shown being implemented by electronic device 100, location subsystem 170, merchant subsystem 200, acquiring bank subsystem 300, commercial entity subsystem 400, and financial institution subsystem 350. However, it is to be understood that process 500 may be implemented using any other suitable components or subsystems. Process 500 may provide a seamless user experience for conducting payments with merchant subsystem 200 on device 100. Process 500 may begin at step 502, where merchant subsystem 200 may share merchant context data with electronic device 100 (e.g., directly or via location subsystem 170). For example, such merchant context data may include any suitable data for identifying one or more particular characteristics of a purchase transaction to be financed. For example, the merchant context data communicated from merchant subsystem 200 directly to device 100 (e.g., via path 15 or via a bi-directional path along which data 5 may also be communicated) and/or via location subsystem 170 (e.g., via paths 93 and 95) may include a merchant identifier that may identify the particular merchant sending the data, a transaction identifier that may identify a particular purchase transaction to be financed, one or more pieces of information specific to such a transaction (e.g., purchase price, description of product/service being purchased, shipping information, etc.), identification of the currency to be used during such a transaction, a list of financial institutions whose payment credentials may be accepted or preferred or otherwise recommended by merchant subsystem 200 (e.g., whether or not a particular transaction to be financed between electronic device 100 and merchant subsystem 200 is at least partially currently known), and/or one or more fields of customizable information that may be uniquely customized by merchant subsystem 200 for a particular transaction and/or for a particular time period and/or for a particular type of user electronic device or user/purchaser (e.g., information describing why one payment credential may be recommended or preferred over another, additional information that may be requested of the purchaser, such as a request for selection of one of several options for a complimentary gift from the merchant to the purchaser, etc.). In some embodiments, at least a portion of such data may be transmitted by location subsystem 170 for receipt by any device 100 within a certain distance of location subsystem 170 (e.g., 15 feet), such that any device 100 that may currently be conducting a financial transaction with merchant subsystem 200 or that may be located in an area that is likely suitable to facilitate a potential financial transaction with merchant subsystem 200 in the future due to its current position proximate merchant subsystem 200 may receive certain context data that may at least partially configure recommendations to device 100 (e.g., one or more recommendations for using one particular payment credential available to device 100 over another for any suitable financial transaction with merchant subsystem 200). In some embodiments, location subsystem 170 may leverage geo-fencing or iBeacon™ (e.g., as provided by Apple Inc.) or any other suitable geographic- or proximity- or location-based technology for providing merchant context information to any suitable devices 100 with any suitable relationships to merchant subsystem 200 and/or location subsystem 170. Electronic device 100 may include one or more sensors (e.g., as any suitable input component 110, communications component 106, application 103/113, and/or otherwise) that may be operative to enable device 100 to be a location-aware device (e.g., of a location-based service in cooperation with location subsystem 170 or any other remote subsystem(s) that may be operative to enable location-based services or any other suitable contextual-based services). Device 100 may be operative to leverage a global positioning system service and/or use any other suitable mechanism to determine its current location and then leverage that location to detect any appropriate merchant context data that may be associated with that location. Such merchant context data may be included in information provided to device 100 when device 100 may be receiving local Wi-Fi scan results (e.g., a Wi-Fi router of a merchant may be operative to include not only its router's name and other suitable information for enabling device 100 to join a particular Wi-Fi network, but may also include any suitable merchant context data of step 502, whether or not device 100 actually joins that network).

Next, at step 504, process 500 may include device 100 presenting payment recommendation data to a user of device 100 based at least in part on any merchant context data received at step 502. Such recommendation data may be based on at least a portion of the received merchant context data supplementing and/or overriding any previously defined or default payment preference data of device 100 (e.g., as may have been previously established by a user or application of device 100). Then, at step 506, process 500 may include device 100 receiving payment selection data (e.g., from a user of device 100), where such payment selection data may be at least partially based on the payment recommendation data provided at step 504. Such payment selection data may identify and, in some embodiments, authenticate a particular payment credential resident on electronic device 100 (e.g., on secure element 145) for use in funding a transaction with merchant subsystem 200.

Next, at step 508, process 500 may include electronic device 100 communicating payment card data associated with the identified payment credential of step 506 to merchant subsystem 200. For example, such payment card data may be encrypted in any suitable manner by device 100 and transmitted from NFC component 120 to merchant terminal 220 (e.g., as communication 5) and/or from communications component 106 of electronic device 100 to server 210 of merchant subsystem 200 via communications path 15 (e.g., as communication 670), or via commercial entity subsystem 400 to merchant subsystem 200 (e.g., as communication 671, described below). After the payment card data communicated from electronic device 100 at step 508 has been received by merchant subsystem 200, process 500 may include merchant subsystem 200 utilizing that payment card data to execute a financial transaction with acquiring bank 300 and/or financial institution subsystem 350 at step 510. For example, merchant subsystem 200 may forward that payment card data to acquiring bank 300 and/or financial institution subsystem 350 (e.g., via communications path 25 and/or communications path 35) such that a funding account associated with that payment card data may be identified and used by acquiring bank 300 and/or financial institution subsystem 350 to fund a financial transaction. Next, after such a transaction has been executed at step 510, process 500 may include merchant subsystem 200 confirming that execution to electronic device 100 at step 512. For example, merchant subsystem 200 may communicate any suitable confirmation information to electronic device 100 via communications path 15.

Therefore, process 500 may leverage merchant context data of step 502 to suggest or otherwise manipulate the way in which device 100 may present payment recommendation data and/or enable selection of a particular payment credential of device 100 for funding a transaction with merchant subsystem 200. Such merchant context data may be generated by merchant subsystem 200 and provided directly to device 100 or via any other suitable communication set-up, such as via a location subsystem 170 that may share at least a portion of such merchant context data to device 100 based on a location or distance of device 100 with respect to at least a portion of merchant subsystem 200.

It is understood that the steps shown in process 500 of FIG. 5 are merely illustrative and that existing steps may be modified or omitted, additional steps may be added, and the order of certain steps may be altered.

FIG. 6 is a flowchart of an illustrative process 600 for conducting payments. Process 600 is shown being implemented by electronic device 100, location subsystem 170, merchant subsystem 200, acquiring bank subsystem 300, commercial entity subsystem 400, and financial institution subsystem 350. However, it is to be understood that process 600 may be implemented using any other suitable components or subsystems. Process 600 may provide a seamless user experience for conducting payments with merchant subsystem 200 on device 100. Process 600 may begin at step 602, where access data 652 (e.g., access data 652 of FIG. 1A) may be provisioned on a secure element of electronic device 100 by commercial entity subsystem 400. For example, at least one access SSD (e.g., SSD 154*b*) may be provisioned on a secure element (e.g., NFC component 120) of device 100 as access data 652 from server 410 of commercial entity subsystem 400 in order to more securely enable device 100 to conduct a financial transaction with merchant subsystem 200. As mentioned, access SSD 154*b* may be at least partially provisioned on a secure element of NFC component 120 of electronic device 100 directly from commercial entity subsystem 400 (e.g., as access data 652 via communication path 65 between server 410 of commercial entity subsystem 400 and communications component 106 of device 100, which may then be passed to NFC component 120 from communications component 106 (e.g., via bus 118)). Access data 652 via path 65 may be provisioned on a secure element of device 100 as at least a portion or all of an access SSD 154*b* and may include access applet 153*b* and/or access key 155*b*. Step 602 may be at least partially carried out when device 100 is initially configured (e.g., by commercial entity subsystem 400 before device 100 is sold to a user). Alternatively, step 602 may be at least partially carried out in response to a user of device 100 initially setting up NFC component 120. Additionally or alternatively, access data 652 may include ISD key 156*k* for ISD 152 of the secure element of electronic device 100 and may be used in addition to or as an alternative to access key 155*b* for enabling secure transmissions between commercial entity subsystem 400 and electronic device 100. Additionally or alternatively, access data 652 may include CRS 151*k* of CRS 151 and/or CASD 158*k* of CASD 158 of secure element 145 of electronic device 100 and may be used in addition to or as an alternative to access key 155*b* and/or access key 155*a* and/or ISD key 156*k* for enabling secure transmissions between commercial entity subsystem 400 and electronic device 100.

At step 604, process 600 may include provisioning credential data 654 (e.g., credential data 654 of FIG. 1A) on a secure element of electronic device 100 by financial institution subsystem 350, in some embodiments, via commercial entity subsystem 400. For example, such credential data 654 may be at least partially provisioned on a secure element of NFC component 120 of electronic device 100 directly from financial institution subsystem 350 (e.g., via communication path 75 of FIG. 1A between financial institution subsystem 350 and device 100, which may be passed to NFC component 120 via communications component 106). Additionally or alternatively, such credential data 654 may be at least partially provisioned on a secure element of NFC component 120 of electronic device 100 from financial institution subsystem 350 via commercial entity subsystem 400 (e.g., via communication path 55 of FIG. 1A between financial institution subsystem 350 and commercial entity subsystem 400, which may be passed to device 100 as credential data 654 via communication path 65 of FIG. 1A between server 410 of commercial entity subsystem 400 and communications component 106 of device 100, which may then be passed to NFC component 120 from communications component 106 (e.g., via bus 118)). Credential data 654 via path 75 and/or via path 65 may be provisioned on a secure element of device 100 as at least a portion or all of credential SSD 154*a* and may include credential applet 153*a* and/or credential key 155*a*'. Step 604 may be at least partially carried out when a user of device 100 selects a particular credential to be provisioned on device 100. In some embodiments, credential data 654 may also include access key 155*a*, which may be initially provided from commercial entity subsystem 400 to financial institution subsystem 350 and/or may be added by commercial entity subsystem 400.

The credential data provisioned on device 100 may include all data necessary to make a payment with that credential, such as, for example, a primary account number ("PAN"), a card security code (e.g., a card verification code ("CVV")), expiration date, name associated with the credential, and the like. A "virtual" credential or virtual PAN or device PAN ("D-PAN") may be provisioned on device 100 rather than the user's "actual" credential or actual PAN or finding PAN ("F-PAN"). For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 312 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization request indicative of that virtual credential (e.g., as data 674 of FIG. 1A) and may conduct an analysis of that authorization request in light of the actual credential associated with the virtual credential as determined by table 312. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 312 for linking the virtual credential to the actual credential during certain transactions. Multiple credentials may be provisioned on device 100 at one or multiple different instances of step 604, where different credentials may be associated with different payment network subsystems 360 and/or different issuing bank subsystems 370 of financial institution subsystem 350.

At step 605, device 100 may be configured to set default priorities and/or enable a user to set user preferred priorities for certain payment credentials provisioned on device 100 (e.g., the various credentials provisioned on secure element 145 at one or multiple iterations of step 604). Such priorities may be configured to present a particular credential as a default/preferred credential for all situations or for different certain situations (e.g., prioritize an American Express credential over a Mastercard credential for all online payments yet prioritize a Mastercard credential over an American Express credential for local NFC payments, or prioritize an American Express credential over a Mastercard credential during the first half of each calendar month yet prioritize a Mastercard credential over an American Express credential for the second half of each calendar month, or prioritize an American Express credential over a Mastercard credential for payments when device 100 is at a first location yet prioritize a Mastercard credential over an American Express credential when device 100 is at a second location). Any suitable priorities may be defined at step 605 using any suitable techniques (e.g., via any suitable UI applications that may be provided to a user of device 100, such as via a Passbook or wallet application of device 100).

At step 606, process 600 may include sharing merchant context data 656 from merchant subsystem 200 with electronic device 100 (e.g., directly or via location subsystem 170). As described above with respect to step 502 of process 500, as well as below in more detail, such merchant context data 656 may include any suitable data for identifying one or more particular characteristics of merchant subsystem 200 and/or a purchase transaction to be financed. For example, merchant context data 656 may be communicated from merchant subsystem 200 directly to device 100 (e.g., via path 15 or via a bi-directional path along which data 5 may also be communicated) and/or via location subsystem 170 (e.g., via paths 93 and 95). Merchant context data 656 may include any suitable information, such as a merchant identifier that may identify the particular merchant sending the data, a transaction identifier that may identify a particular purchase transaction to be financed, one or more pieces of information specific to such a transaction (e.g., purchase price, description of product/service being purchased, shipping information, etc.), identification of the currency to be used during such a transaction, a list of financial institutions whose payment credentials may be accepted or preferred or otherwise recommended by merchant subsystem 200 (e.g., whether or not a particular transaction to be financed between electronic device 100 and merchant subsystem 200 is at least partially currently known), and/or one or more fields of customizable information that may be uniquely customized by merchant subsystem 200 for a particular transaction and/or for a particular time period and/or for a particular type of user electronic device or user/purchaser (e.g., information describing why one payment credential may be recommended or preferred over another, additional information that may be requested of the purchaser, such as a request for selection of one of several options for a complimentary gift from the merchant to the purchaser, etc.). In some embodiments, at least a portion of such merchant context data 656 may be transmitted by location subsystem 170 for receipt by any device 100 within a certain distance (e.g., FIG. 1's distance D') of location subsystem 170 (e.g., 15 feet), such that any device 100 that may currently be conducting a financial transaction with merchant subsystem 200 or that may potentially conduct a financial transaction with merchant subsystem 200 in the future due to its current position proximate merchant subsystem 200 may receive certain context data that may at least partially configure recommendations to device 100 (e.g., one or more recommendations for using one particular payment credential available to device 100 over another for any suitable financial transaction with merchant subsystem 200).

At step 607, process 600 may include associating a merchant's online resource, such as a merchant application 113 or a merchant website, with a merchant key 157. For example, commercial entity subsystem 400 may populate a table 430 to associate a merchant key 157 with a merchant's resource (e.g., application 113 or website) for enabling a secure commerce credential data communication (e.g., an online-based communication 670 of FIG. 1A) between device 100 and merchant subsystem 200 using that merchant resource. Both merchant subsystem 200 and commercial entity subsystem 400 may store a version of such a merchant key 157 (e.g., in a respective secure element of merchant subsystem 200 and commercial entity subsystem 400, as shown in FIG. 1A). In some embodiments, in order to participate in an online-resource payment program, a merchant may be required to register as a member of a program run by the commercial entity of commercial entity subsystem 400 and/or obtain a merchant certificate. Merchants may not be able to receive payment data without a certificate. Each certificate may contain a unique merchant identifier that may bind the merchant to the public key for that merchant (e.g., a public merchant key 157). A merchant may obtain multiple certificates, and thus may hold more than one identity. Such a unique merchant identifier may be provided by merchant subsystem 200 to device 100 (e.g., at step 610 as a portion of data 660 and/or as an inherent element of the online resource running on device 100 (e.g., merchant application 113), and such a merchant identifier may be provided from device 100 to commercial entity subsystem 400 during an attempted transaction (e.g., as at least a portion of data 664 at step 614 described below).

At step 608, process 600 may include a merchant's online resource 658 (e.g., a merchant's third party application 113 of FIG. 1A or website) being accessed by device 100. As shown in FIG. 1A, a merchant's third party application 113 may be loaded onto device 100 from commercial entity subsystem 400 (e.g., from application store 420). For example, as shown in FIG. 4, a user may select "Merchant App" icon 183 of a specific screen 190 of GUI 180 using touch screen input component 110f of I/O component 114a, and this selection may be recognized by electronic device 100 as an initiation event for providing the user with the ability to interact with a merchant's third party application 113. Alternatively or additionally, such an online resource 658 may be accessed by electronic device 100 directly from merchant subsystem 200. In response to such a selection of a merchant application icon 183, GUI 180 may provide an interactive screen where electronic device 100 may enable the user to interact with application 113 to peruse commercially available items from the merchant for purchase. Alternatively, step 608 may include device 100 accessing a merchant's online resource 658 as a merchant's webpage from merchant subsystem 200 (e.g., via merchant server 210) using an internet application of device 100, which may also be selectable by an "Internet" icon 182 of specific screen 190 of GUI 180 of FIG. 4 for providing the user with the ability to interact with a merchant's webpage rather than with a merchant's third part application.

Next, at step 610, device 100 may receive potential transaction data 660 from the accessed online resource of the merchant. For example, as shown in FIG. 1A, potential transaction data 660 may be provided to device 100 from merchant subsystem 200 (e.g., from merchant server 210) when device 100 is interacting with the merchant's third party application 113 or the merchant's website or any other suitable online resource (e.g., resource 658) of the merchant. Alternatively or additionally, at least a portion of potential transaction data 660 may be locally accessible by device 100 via application 113 local to device 100 (e.g., when application 113 is stored in memory component 104 or being run by processor 102 of device 100), rather than the data being actively sent to device 100 from merchant server 210 at step 610. For example, when application 113 is initially stored on device 100 (e.g., at step 608 as merchant's online resource 658), at least some of potential transaction data 660 may be generated by that initially stored application 113 absent any additional information provided to device 100 by merchant subsystem 200. Potential transaction data 660 may include any suitable data indicative of one or more particular characteristics of a potential purchase transaction to be financed between a user of device 100 and a merchant of merchant subsystem 200, including, but not limited to, a merchant identifier that may identify the particular merchant sending the data, identification of the particular merchant resource being used (e.g., the particular merchant application 113 or website being accessed by device 100), a transaction identifier that may identify the particular purchase transaction to be financed, one or more pieces of information specific to that transaction (e.g., purchase price, description of product/ service being purchased or rented or otherwise paid for, shipping information, etc.), identification of the currency to be used during the transaction, a list of financial institutions whose payment credentials may be accepted or preferred or otherwise recommended by merchant subsystem 200, and/or one or more fields of customizable information that may be uniquely customized by merchant subsystem 200 for a particular transaction (e.g., additional information that may be requested of the purchaser, such as a request for selection of one of several options for a complimentary gift from the merchant to the purchaser, etc.), and/or any other suitable information. In some embodiments, at least a portion of such transaction data 660 may include data similar to at least a portion of merchant context data 656 that may be shared (e.g., at step 606), which may at least partially configure recommendations to device 100 (e.g., one or more recommendations for using one particular payment credential available to device 100 over another for the particular financial transaction with merchant subsystem 200). Alternatively, certain potential transaction data may be received via a bi-directional communications path that may also be operative to communicate data 5 from device 100 to merchant subsystem 200.

Merchant context data 656 and/or potential transaction data 660 may define a merchant's request for device 100 to produce a payment token for the purchase of products and/or services and may encapsulate any suitable information about the potential transaction including, for example, information about the merchants payment processing capabilities, an amount to pay, and the currency code. Merchant context data 656 and/or potential transaction data 660 may also include a list of one or more financial institutions or payment credential types (e.g., credentials supported by one or more payment networks (e.g., payment network subsystem(s) 360) and/or issuing banks (e.g., issuing bank subsystem(s) 370)) that may be supported by merchant subsystem 200 such that device 100 may be configured to determine whether any of such listed one or more payment credential types has an authorized payment credential on device 100. If such a match exists, for example, as shown in FIG. 4A, GUI 180 may provide screen 190a, where a device application (e.g., wallet application 103 and/or a merchant online resource 113) may use merchant context data 656 and/or potential transaction data 660 to show to a user the name of the merchant (e.g., "Merchant A") with information 191a, the name of the product (e.g., "Product B") with information 191b, the price (e.g., "Price C") with information 191c, and/or initial shipping data (e.g., "Address D") with information 191d. Merchant context data 656 and/or potential transaction data 660 that may be provided to device 100 by merchant subsystem 200 may be indicative of such information 191a, 191b, 191c, and/or 191d. Moreover, based on such merchant context data 656 and/or potential transaction data 660, device 100 may be configured to provide screen 190a of GUI 180 of device 100 that may also include a purchase prompt 193 that may ask the user whether he or she wishes to make a purchase from the merchant according to the details of data 656/660. Moreover, as shown in FIG. 4A, screen 190a may prompt a user to interact with device 100 in one or more ways to choose a specific credential available to device 100 for making a purchase, for example, by including a credential selection prompt 195 that may enable a user to select one of potentially multiple credentials that may be provisioned on device 100 (e.g., the credential of credential SSD 154a). Prompt 195 may only include credentials that are associated with payment credentials supported by the merchant (e.g., as may be determined by data 656/660, as mentioned above).

As shown, prompt 195 may be configured to prioritize or recommend certain credentials over other credentials based on suggestions that may be provided by data 656/660 from merchant subsystem 200. Such suggestions may be configured to override any defaults or preferences that may have been configured by device 100 or a user thereof (e.g., at step 605), such that merchant context data may provide intelligent and/or context-based payment credential recommendations to a user of device 100 at prompt 195 of step 611 (e.g., with screen 190a). At step 611, device 100 may be operative to analyze any received merchant context data in combination with data indicative of the one or more credentials available to device 100 (e.g., on secure element 145) and/or in combination with any preferences that may have been configured at step 605 or otherwise and, based on such analysis, generate and present prompt 195 (e.g., with screen 190a). For example, as shown, a first credential Y may be provided at the top of a list of one or more credentials of prompt 195, and may be demarked with a default indicator "(D)", which may be operative to indicate that credential Y is currently the default credential to be used for a transaction, as may be dictated by data 656/660 and the processing of step 611. Moreover, credential Y may be associated with a reasoning indicator "(R1)", which may provide one or more reasons or incentives to use credential Y (e.g., rather than any other credential available to device 100). Moreover, prompt 195 may include a second credential X that may be provided just below credential Y in a list of one or more credentials of prompt 195, and may be associated with a reasoning indicator "(R2)", which may provide one or more reasons or incentives to use credential X. Additionally or alternatively, prompt 195 may include a third credential Z that may be provided just below credential X in a list of one or more credentials of prompt 195, and may be associated with a reasoning indicator "(R3)", which may provide one or more reasons or incentives to use credential Z.

It is to be appreciated that the list of credentials and demarcation "D" may be the same as or different from a default list that may be generated based solely on any user/device preferences (e.g., defined at step 605) and not based on any merchant context data. For example, a default list (e.g., based on defaults or preferences of step 605 or otherwise but not based on any merchant context data) may be configured to provide credential X first with default demarcation "D", then credential Y, then credential Z, absent any merchant context information, but such merchant context information of data 656/660 may be configured to override such default configuration if received by an application of device 100 such that screen 190a of FIG. 4A may be provided. In some embodiments, if a credential available to device 100 is not able to be accepted for use by merchant subsystem 200 (e.g., as may be determined by processing of merchant context data by device 100, such a credential may still be presented at step 611 (e.g., by screen 190a), but the presentation of that credential may be such that it is conveyed to the user of device 100 that such a credential may not be selected (e.g., if credential Z is available to device 100 but not able to be accepted by merchant subsystem 200, reasoning indicator (R3) may indicate that credential Z is not able to be selected for a transaction with merchant subsystem 200 or the credential Z indicator may be grayed out). In other embodiments, such a credential may not be presented at step 611 by device 100. Device 100 (e.g., processor 102) may be operative to access credential availability data, such as any suitable information indicative of the one or more credentials available to device 100 (e.g., life cycle state information from CRS application 151), and may process that credential availability data along with user preference data (e.g., data based on user interaction at step 605) and/or any device setting data (e.g., current firmware or application settings and/or rules) at step 611 to determine the proper recommendation data to be presented to the user and/or to determine any suitable credential to automatically leverage for use. In some embodiments, the payment recommendation data generated at step 611 may include information indicative of a credential that may not currently be available to device 100. For example, merchant context data may recommend that credential Z be used, but such a credential Z may not currently be provisioned on device 100, such that device 100 may process such merchant context data in light of data indicative of credential Z not being currently available to device 100 at step 611 in order to generate payment recommendation data that may include an option for a user to provision such a credential Z on device 100 (e.g., reasoning indicator "(R3)" of screen 190a may include a description of the benefit of using credential Z for a particular transaction and may alternatively or additionally include a description of the fact that credential Z is not currently provisioned on device 100 but that the user may initiate such provisioning by selecting credential Z at prompt 195, and in response to such a selection of credential Z, provisioning of a credential Z onto device 100 may commence).

Any reasoning indicator (e.g., reasoning indicator "X" and/or reasoning indicator "Y" and/or reasoning indicator "Z") may include any suitable information that may be indicative of one or more reasons why the credential associated with that indicator may be recommended or not recommended for use (e.g., a reasoning indicator may be "use of this credential is recommended as it will provide you 5% cash back due to a special merchant deal only available for the next 20 minutes"). For example, such reasoning may be based on information provided by merchant context data accessible to device 100. Additionally or alternatively, such reasoning may be based on not only merchant context data but also any user preference data or other data accessible to device 100 (e.g., credential availability data). For example, a reasoning indication may communicate "use of this credential is recommended as it offers double airline miles if used with this merchant, but you must first provision this card on your device if you would like to use it" or "use of this credential is recommended as it offers double airline miles if used with this merchant, but you have user another credential the last 5 times you transacted with this merchant".

While, normally, a user may select a default/preferred card for payment (e.g., based on configurations of step 605), some merchants may not take certain payment cards, or they may offer a discount if certain payment methods are available and used. Process 600 can use GeoFence and/or iBeacon or any other suitable contextual technologies to indicate to the payment device of options, and if the user is open to using a different method, auto-switch on the user's behalf Therefore, intelligent payment selection or recommendations may leverage location cues or other merchant context information. As a user with device 100 may enter a merchant's establishment, merchant context information may be accessible by device 100 and operative to enable device 100 to automatically select, or present options to a user for selection of, optimal or accepted payment methods over defaults ones. Additionally or alternatively, intelligent payment selection using incentives may be provided. As a user with device 100 enters a merchant's establishment, merchant context information or cues may be provided to indicate to device 100 that incentives are available to use certain payment methods over defaults ones. As a specific example, a first payment credential of device 100 (e.g., an American Express payment credential (e.g., credential X)) may be configured as a default credential for all transactions with device 100 (e.g., at step 605), yet then device 100 may enter a geo-fence area (e.g., by device 100 being within distance D' of location subsystem 170 of merchant subsystem 200) for receiving merchant context data 656, where merchant subsystem 200 may leverage such merchant context data to indicate that the merchant is offering a 5% discount if a user uses a payment credential that is a Mastercard credential (e.g., credential Y), such that such merchant context data may be processed by device 100 so as to generate appropriate payment recommendation data that may be provided to a user (e.g., at step 611) that may prioritize credential Y over credential X (e.g., if device 100 is configured to allow such merchant context data to override any device/user configurations). Process 600 could leverage geo-fencings to auto-update the priority of one card over another in certain locations (e.g., at certain merchant stores). Alternatively, in response to determining the identity of a particular merchant (e.g., via data 656/660), device 100 may be configured to determine a prioritized credential to suggest over others (e.g., based on past uses of a particular card at that merchant or similar merchants (e.g., through leveraging heuristics and/or user history for particular merchant context information)). A particular merchant with an appropriate location subsystem 170 may alert a device 100 each time it is within a particular distance that there is a particular special at that moment, where use of a particular credential may provide a certain incentive (e.g., 5% back).

Merchant context data may be provided to device 100 in response to device 100 having a particular physical relationship with merchant subsystem 200 (e.g., when able to receive data from location subsystem 170 while within a threshold distance D'), which may be helpful for inducing certain types of payments using data 5 with terminal 5 of merchant subsystem 200. Additionally or alternatively, such merchant context data may be provided to device 100 in response to device 100 interacting with a merchant application of merchant subsystem 200 (e.g., via communications path 15). Such merchant context data may be provided to device 100 via a bi-directional path along which data 5 may also be communicated and/or via communications path 15 (e.g., when device 100 may be running an online merchant application 113). Such merchant context data may be defined and/or updated by merchant subsystem 200 at any suitable time based on any suitable situation. For example, merchant context data may change based on the time of day (e.g., American Express credentials may be preferred or incentivized by merchant subsystem 200 for use from 2:00 PM through 5:00 PM, while Mastercard credentials may be preferred or incentivized by merchant subsystem 200 for use at all other times during the day). Merchant context data may be changed based on any suitable information, such as the amount of transactions that merchant subsystem 200 has handled for one or more particular financial institutions over a period of time (e.g., once more than 50% of the transactions handled by merchant subsystem 200 in a given time frame or once more than 500 transactions handled by merchant subsystem 200 in a given time frame have been for a first type of credential (e.g., American Express credit cards), then merchant context data may be updated to recommend use of another type of credential (e.g., Mastercard credit cards) over that first type of credential for the remainder of that given time frame). Previous use and/or user selection of certain credentials in certain situations may be analyzed and processed by device 100 (e.g., at step 611) in order to determine what recommendation data to present. For example, if the last five times device 100 was located within distance D' of location subsystem 170, credential X was selected by a user of device 100, despite merchant context data recommending that credential Y be used over credential X (e.g., as shown in FIG. 4A), then device may be operative to present credential X as the default or most recommended credential over credential Y despite merchant context data indicating otherwise, as the processing and generating of recommendation data (e.g., at step 611) may be operative to weigh previous user selection data over merchant context data.

Merchant context data 656 and/or potential transaction data 660 may be provided from merchant subsystem 200 (e.g., via terminal 220 and/or server 210 and/or location subsystem 170) to device 100 via a path along which data 5 may also be communicated and may be received by NFC component 120 and/or via communication path 15/93/95 of FIG. 1A and may be received by communications component 106 of device 100. Communications component 106 may pass this merchant context data 656 and/or potential transaction data 660 on to processor 102 (e.g., for displaying on screen 190a as part of a user interface for an application on device 100 (e.g., for information 191a-191d, 193, and/or 195)) and/or to NFC component 120. For example, NFC component 120 may utilize such merchant context data 656 and/or potential transaction data 660 for securely enabling a financial transaction between device 100 and merchant subsystem 200, as further described below. In some embodiments, merchant context data 656 and/or potential transaction data 660 may be referred to as payment request data and/or a uniform resource locator ("URL") or any other suitable reference character string and/or query string.

Moreover, besides presenting such payment recommendation data (e.g., as prompt 195) based on data 656/660, step 611 of process 600 may also include receiving intent and authentication by a user of device 100 to utilize a specific credential for carrying out a financial transaction for a particular merchant, product, price, and shipping destination based on data 656/660. Screen 190a of FIG. 4A may prompt a user to interact with device 100 in one or more ways to choose a specific credential available to device 100 for making the purchase (e.g., through selection of credential Y in the list of credentials of prompt 195). As shown in FIG. 4B, output display component 112a may be configured to provide screen 190b in response to receiving user selection of a credential from credential selection prompt 195 of screen 190a of FIG. 4A. Screen 190b of FIG. 4B may prompt a user to interact with device 100 in one or more ways to authenticate the user and its intent to utilize the selected credential (i.e., credential Y of credential entry 197 of screen 190b). This may include prompting the user (e.g., with an authentication prompt 198) to enter user authentication via personal identification number ("PIN") entry or via user interaction with a biometric sensor in order to access the secure element of device 100 and, thus, the credential to be used for the purchase. Access SSD 154b may leverage applet 153b to determine whether such authentication has occurred before allowing other SSDs 154 (e.g., credential SSD 154a) to be used for enabling its credential information in a commerce credential data communication. As just one example of step 611, applet 153b of access SSD 154b may be configured to determine intent and local authentication of a user of device 100 (e.g., via one or more input components 110, such as a biometric input component 110i of FIG. 4, as may be used by a user interacting with application 113 via GUI 180) and, in response to such a determination, may be configured to enable another particular SSD for conducting a payment transaction (e.g., with a credential of credential SSD 154a, which may be for the selected credential Y). In some embodiments, after such a determination, but before such enablement, output display component 112a may be configured to provide screen 190c of FIG. 4C that may prompt a user (e.g., with a payment prompt 199) to interact with device 100 in one or more ways to finally initiate payment to merchant subsystem 200 according to data 656/660 using the selected and authenticated credential.

Next, at steps 612-614, process 600 may include device 100 generating, encrypting, and transmitting commercial entity credential data 664 for use by commercial entity subsystem 400. Once the credential of credential SSD 154a on a secure element of device 100 has been selected, authenticated, and/or enabled for use in a financial transaction (e.g., at step 611), the secure element of device 100 (e.g., processor module 142 of NFC component 120) may encrypt that credential data for use by commercial entity subsystem 400. For example, secure element ("SE") credential data 661 of credential SSD 154a (e.g., applet data 153a) may be encrypted with credential key 155a' at step 612 as encrypted SE credential data 662, such that the encrypted SE credential data 662 may only be decrypted by an entity with access to that credential key 155a' (e.g., financial institution subsystem 350) for accessing SE credential data 661. That SE credential data 661 may include all data necessary to make a payment with that credential, such as, for example, a primary account number (e.g., an actual F-PAN or a virtual D-PAN), a card security code (e.g., a card verification code ("CVV")), expiration date, name associated with the credential, and/or the like. Once some or all of that SE credential data 661 of credential SSD 154a has been encrypted with credential key 155a' at step 612 as encrypted SE credential data 662, that encrypted SE credential data 662, either alone or along with at least a first portion of potential transaction data 660 (e.g., a first portion of potential transaction data 660 that may include identification of the merchant, identification of the price, and/or identification of the product/service) and/or any other suitable information (e.g., any information identifying device 100 itself), may be encrypted by access information (e.g., by access key 155a of SSD 154a, access key 155b of access SSD 154b, ISD key 156k, and/or CRS 151k and/or signed by CASD 158k) at step 613 as encrypted commercial entity ("CE") credential data 663. For example, secure element 145 of device 100 (e.g., processor module 142 of NFC component 120) may use access information to encrypt not only an identification of the merchant from data 660 (e.g., identification of the merchant or its resource being used for the purchase, such as application 113), but also the identification of the amount of the purchase and/or currency code from data 660, as well as the encrypted SE credential data 661 of SSD 154a (e.g., encrypted SE credential data 662) into encrypted commercial entity credential data 663.

Next, encrypted commercial entity credential data 663 along with any additional information, such as at least some of potential transaction data 660 (e.g., identification of the merchant, identification of the price, and/or identification of the product/service) and/or any other suitable information (e.g., any information identifying device 100 itself and/or the merchant in unencrypted form), may together be transmitted as commercial entity transaction data 664 from device 100 to commercial entity subsystem 400 at step 614. Therefore, at least portions of commercial entity transaction data 664 (e.g., encrypted commercial entity credential data 663) may only be decrypted by an entity with access to that access information used for the encryption (e.g., access key 155a, access key 155b, ISD key 156k, CRS 151k, and/or CASD 158k) that generated encrypted commercial entity credential data 663 of commercial entity transaction data 664 (e.g., commercial entity subsystem 400). Such commercial entity transaction data 664 may be generated at steps 612-614 and then transmitted to commercial entity subsystem 400 at step 614 (e.g., from the secure element of NFC component 120, via communications component 106 and communication path 65). Steps 612, 613, and 614 may ensure that any credential data generated and transmitted from the secure element of device 100 as part of commercial entity transaction data 664 has first been encrypted in such a way that it cannot be decrypted by another portion of device 100. That is, SE credential data 661 of commercial entity transaction data 664 may be encrypted as encrypted SE credential data 662 with a credential key 155a' that may not be exposed to or accessible by any portion of device 100 outside of its secure element. Moreover, such encrypted SE credential data 662 of commercial entity transaction data 664 may be encrypted as encrypted commercial entity credential data 663 with an access key (e.g., access key 155a, 155b, 156k, 151k, and/or 158k (e.g., referred to herein as "access information")) that may not be exposed to or accessible by any portion of device 100 outside of its secure element.

Next, at step 616, process 600 may include commercial entity subsystem 400 receiving and decrypting at least a portion of commercial entity transaction data 664. For example, commercial entity subsystem 400 may receive commercial entity transaction data 664 and may then decrypt encrypted commercial entity credential data 663 of commercial entity transaction data 664 using access information (e.g., 155a, 155b, 156k, 151k, and/or 158k) as available at commercial entity subsystem 400. This may enable commercial entity subsystem 400 to determine an unencrypted identification of the merchant (e.g., from decrypted commercial entity credential data 663), while also maintaining SE credential data 661 in an encrypted state (e.g., as encrypted SE credential data 662), because commercial entity subsystem 400 may not have access to credential key 155a' with which such SE credential data 661 may have been encrypted by the secure element of device 100 at step 612 as encrypted SE credential data 662. Additionally or alternatively, the merchant may be identified by the additional data that may have been included in commercial entity transaction data 664 along with encrypted commercial entity credential data 663. Commercial entity transaction data 664 may include information identifying device 100 or at least its secure element, such that, when data 664 is received by commercial entity subsystem 400, commercial entity subsystem 400 may know which access information (e.g., which of access information 155a, 155b, 156k, 151k, and/or 158k) to use at step 616. For example, commercial entity subsystem 400 may have access to multiple access keys 155a/155b and/or multiple ISD keys 156k, each one of which may be particular to a specific device 100 or to a specific secure element.

Next, at step 617, process 600 may include commercial entity subsystem 400 identifying a merchant key 157 associated with the merchant that may have been identified from commercial entity transaction data 664 and then re-encrypting at least a portion of commercial entity credential data 664 using that merchant key 157. That is, after decrypting at least a first portion of commercial entity transaction data 664 using suitable access information at step 616 (e.g., after decrypting encrypted CE credential data 663 to realize encrypted SE credential data 662 and any other information that may have been encrypted in encrypted CE credential data 663), commercial entity subsystem 400 may then, at step 617, re-encrypt at least a second portion of commercial entity transaction data 664 (e.g., encrypted SE credential data 662) with an appropriate merchant key 157 that may be associated with merchant information identified in commercial entity transaction data 664. Such a merchant key 157 may be determined by comparing the merchant information identified in commercial entity transaction data 664 with data in table 430 of FIG. 1A. With this determined appropriate merchant key 157, commercial entity subsystem 400 may re-encrypt with merchant key 157 at least a portion of commercial entity transaction data 664 as encrypted merchant credential data 667 at step 617. For example, encrypted merchant credential data 667 may include at least the encrypted SE credential data 662 from commercial entity transaction data 664 as well as the purchase amount data or other suitable transaction data from commercial entity transaction data 664 (e.g., data that may have been initially identified from transaction data 660). The merchant identification information from commercial entity transaction data 664 may not need to be included in encrypted merchant credential data 667 as that merchant identification may have already been used to determine the merchant key 157 with which encrypted merchant credential data 667 may be encrypted at step 617. Encrypted merchant credential data 667 may be signed by commercial entity subsystem 400 in such a way that, when received by merchant subsystem 200, may establish commercial entity subsystem 400 as the creator of such encrypted merchant credential data 667 and/or may let merchant subsystem 200 ensure that encrypted merchant credential data 667 has not been modified after being signed. Such encrypted merchant credential data 667 may be generated at steps 616 and 617 and then transmitted to electronic device 100 along with any other suitable data as merchant transaction data 668 at step 618 (e.g., from server 410 of commercial entity subsystem 400 to communications component 106 of device 100 via path 65 of FIG. 1A).

Steps 616, 617, and 618 may ensure that credential data transmitted from the commercial entity subsystem 400 as part of merchant transaction data 668 of FIG. 1A (e.g., credential data of encrypted merchant credential data 667 of merchant transaction data 668) may be encrypted in such a way that it cannot be decrypted by a portion of device 100 other than its secure element. That is, merchant transaction data 668 may be encrypted with a merchant key 157 that may not be exposed to or otherwise accessible by any portion of device 100, including, in some embodiments, its secure element. Moreover, credential data of merchant transaction data 668 (e.g., encrypted SE credential data 662 of encrypted merchant credential data 667 of merchant transaction data 668) may be encrypted with a credential key 155a' that may not be exposed to or otherwise accessible by any portion of device 100 outside of its secure element. Merchant transaction data 668 may then be forwarded on to merchant subsystem 200 (e.g., merchant server 210) by device 100 as online-based communication 670 (e.g., via communications component 106 and communication path 15 of FIG. 1A) at step 620. Such online-based communication 670 may at least include some of merchant transaction data 668 (e.g., encrypted merchant credential data 667) and any other suitable information (e.g., information that may be used by merchant application 113 or any other merchant resource (e.g., a merchant website), such as shipping information 1407d). Alternatively, rather than sharing merchant transaction data 668 with merchant subsystem 200 via device 100 as online-based communication 670 at steps 618 and 620, commercial entity subsystem 400 may directly share merchant transaction data 668 with merchant subsystem 200 as online-based communication 671 at step 621 (e.g., via path 85 of FIG. 1A).

In some embodiments, if a transaction is to be funded through sharing payment card data via an NFC communication 5 between device 100 and merchant subsystem 200 while device 100 is local to merchant terminal 220, merchant context data may be received as merchant context data 656 by device 100 (e.g., directly by merchant subsystem 200 and/or via location subsystem 170) at step 606 and, after presentation of payment recommendation data based on such data 656 and receiving user payment selection at step 611, payment card data associated with that selection may be shared via communication 5 at step 620 to merchant terminal 220. Alternatively, in some embodiments, if a transaction is to be funded through an online-based communication 670 or 671 between device 100 and merchant subsystem 200 through use of a merchant online resource 113 on device 100, merchant context data may be received as merchant context data of transaction data 660 by device 100 (e.g., directly by merchant subsystem 200) at step 610 and, after presentation of payment recommendation data based on such data 660 and receiving user payment selection at step 611, payment card data associated with that selection may be shared via communication 670/671 to merchant subsystem 200 through steps 612-620/621.

Once such payment credential data is received by merchant subsystem 200 (e.g., as communication 5 and/or as online-based communication 670/671), process 600 may include step 622 at which merchant subsystem 200 may send confirmation data 672 to device 100 (e.g., via communication path 15 of FIG. 1A). Such confirmation data 672 may be received by device 100 to indicate to a user of device 100 that the user's payment instructions have been received by merchant subsystem 200. After a user of device 100 may provide intent and authentication to utilize a specific credential for carrying out a financial transaction based on merchant context data 656/660 at step 611, the remaining steps of process 600 may occur transparent to the user. That is, once the user provides authentication and intent at step 611, one or more of steps 612-620 or 621 as well as steps 622-630 may occur without any further user interaction and may seem instantaneous to a user, whereby process 600 may appear to a user as if, after step 611, credential data is automatically and instantaneously sent to merchant subsystem 200 and confirmed at step 622.

Moreover, once such payment credential data is received by merchant subsystem 200 (e.g., as communication 5 and/or as online-based communication 670/671), process 600 may also include step 623 at which merchant subsystem 200 may be configured to generate and transmit payment data 673 to acquiring bank subsystem 300 (e.g., via communication path 25 between merchant subsystem 200 and acquiring bank subsystem 300 of FIG. 1A), where data 673 may include payment information and an authorization request that may be indicative of the user's commerce credential and the merchant's purchase price for the product or service (e.g., as included in communication 5/670/671). For example, at step 623, merchant subsystem 200 may leverage its known merchant key 157 to at least partially decrypt merchant transaction data 668 (e.g., as received from communication 671 at step 621 or from communication 670 at step 620), such that payment data 673 may include the SE credential data 661 of credential SSD 154a encrypted with its credential key 155a' (e.g., encrypted SE credential data 662) but not with a key that is not available to financial institution subsystem 350. Then, at step 624, acquiring bank subsystem 300 may forward the authorization request from data 673 to financial institution subsystem 350 as authorization request data 674 (e.g., via communication path 35 between acquiring bank subsystem 300 and financial institution subsystem 350 of FIG. 1A). Next, at step 626, when issuing bank subsystem 370 of financial institution subsystem 350 receives an authorization request (e.g., directly from acquiring bank subsystem 300 as data 674 at step 624, or indirectly via payment network subsystem 360 as data 405 as described above), the payment information (e.g., SE credential data 661 of device 100 as encrypted by credential key 155a' by the secure element of device 100 (e.g., encrypted SE credential data 662)) and the purchase amount, each of which may be included in the authorization request data 674, as well as in data 673, 664, 668, 670, and/or 671, may be decrypted (e.g., using credential key 155a' at financial institution subsystem 350) and analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 676 at step 626 of process 600 (e.g., directly from issuing bank subsystem 370 to acquiring bank subsystem 300 via communication path 35, or from payment network subsystem 360 to acquiring bank subsystem 300 based on authorization response data 415 that may be provided to payment network subsystem 360 from issuing bank subsystem 370 via communication path 45 of FIG. 1A). Next, in response to receiving authorization response data 676 at step 626, process 600 may also include acquiring bank subsystem 300 or any other suitable subsystem may share such authorization response data with merchant subsystem 200 as authorization response data 678 at step 628, which may then be shared with electronic device 100 as authorization response data 680 at step 630.

Therefore, merchant subsystem 200 may be configured to process any suitable communication 5 or online-based communication 670/671 received from device 100 in any suitable way. For example, to obtain the plain text payment credentials from such an online-based communication (e.g., SE credential data 661), merchant subsystem 200 may verify that a signature property of the received data is valid and that commercial entity subsystem 400 is the signer of that signature. Merchant subsystem 200 may use any suitable technique to determine which merchant key (e.g., which merchant public key 157) may have been used by commercial entity subsystem 400 to construct the encrypted merchant credential data (e.g., data 667). Then, merchant subsystem 200 may retrieve the corresponding merchant private key (e.g., merchant private key 157 at merchant subsystem 200) and use that retrieved key to de-encapsulate and/or decrypt encrypted merchant credential data 667 to recover encrypted SE credential data 662. Then such data 662 may be provided to the appropriate payment network 360, which may leverage the appropriate credential key 155a' of financial institution subsystem 350 to de-encapsulate and/or decrypt encrypted SE credential data 662 to recover SE credential data 661 (e.g., to recover the plain text payment information for the payment credential, such as full EMV ("Europay MasterCard Visa") payment data).

In some embodiments, once device 100 is ready to prepare CE transaction data (e.g., data 664) to commercial entity subsystem 400 for a new online resource transaction (e.g., after step 611) but before doing so, device 100 may be configured to request certain data from commercial entity subsystem. For example, prior to step 612 but after step 610, device 100 may request certain CE feature information (e.g., an unpredictable number or other suitable data) that may be leveraged by device 100 and process 600 for adding an additional layer of security to process 600. For example, in response to such a request, such CE feature information may be provided from commercial entity 400 to device 100 (e.g., at a step (not shown) before step 612), and such CE feature information may be encrypted along with other data by secure element 145. For example, such CE feature information may be encrypted along with SE credential data 661 as encrypted SE credential data 662 at step 612. Alternatively or additionally, such CE feature information may be encrypted along with encrypted SE credential data 662 as encrypted CE credential data 663 at step 613. In any event, such CE feature information may be included in CE transaction data 664 to commercial entity subsystem 400 and may be accessed by commercial entity subsystem 400 and compared to the CE feature information it generated earlier to confirm a match or determine any potential fraudulent behavior (e.g., if such CE feature information were encrypted at step 613). Additionally or alternatively, such CE feature information may be included in CE transaction data 664 and in communication 670 such that it may be received by merchant subsystem 200 (e.g., via device 100). Moreover, such CE feature information may be provided directly from commercial entity subsystem 400 to merchant subsystem 200 (e.g., as a communication 671 at step 621 or at any other point in process 600 prior to step 622), such that merchant subsystem 200 may compare such CE feature information encrypted by device 100 and received by merchant subsystem 200 as at least a portion of communication 670 with such CE feature information that may be received by merchant subsystem 200 directly from commercial entity subsystem 400. Such a comparison, if matching, may add another layer of security on which merchant subsystem 200 may rely when determining that communication 670 is not fraudulent and may be used for conducting a financial transaction. Such CE feature information (e.g., an unpredictable number initially) may be generated by commercial entity subsystem 400, may be encrypted on secure element 145 (e.g., at step 612 and/or step 613) and provided to merchant subsystem 200 (e.g., as a portion of communication 670 at step 620), and such CE feature information may also be provided to merchant subsystem 200 directly from commercial entity subsystem 400 (e.g., as communication 671 at step 621), such that both instances of such CE feature information may be utilized by merchant subsystem 200 and/or by any remaining step of process 600 as a layer of security to the process.

Process 600 may ensure that system 1 may leverage security keys accessible to a security element of device 100 so as to securely communicate credential data to merchant subsystem 200 for use by financial institution subsystem 350 while enabling certain keys to be properly managed by commercial entity subsystem 400. That is, secure element 145 of device 100 (e.g., NFC component 120) may contain credential key 155a' and access information (e.g., 155a, 155b, 156k, 151k, and/or 158k), commercial entity subsystem 400 may contain access information (e.g., 155a, 155b, 156k, 151k, and/or 158k) and merchant key 157, merchant entity 200 may contain merchant key 157, and financial institution subsystem 350 may contain credential key 155a'. Due to the fact that device 100 and commercial entity subsystem 400 may each contain or have access to access information (e.g., 155a, 155b, 156k, 151k, and/or 158k), device 100 may securely share encrypted credential data with commercial entity subsystem 400 (e.g., as data 664 at step 614). Similarly, due to the fact that commercial entity subsystem 400 and merchant subsystem 200 may each contain or have access to merchant key 157, commercial entity subsystem 400 may securely share encrypted credential data with merchant subsystem 200 (e.g., as data 671 at step 621 or via device 100 as data 670 at step 620). Then, merchant subsystem 200, via acquiring bank subsystem 300, may share this encrypted credential data with financial institution subsystem 350 that may finally decrypt the encrypted credential data with credential key 155a'. However, in some embodiments, none of the credential data of the secure element of device 100 (e.g., SE credential data 661 of applet 153a of SSD 154a) may be shared with a non-secure element of device 100 (e.g., processor 102 and/or communications component 106) in a decrypted state, nor may credential key 155a' be made available to such a non-secure element of device 100. Credential key 155a' may be managed by financial institution subsystem 350, while certain access information (e.g., 155a, 155b, 156k, 151k, and/or 158k) may be managed by or otherwise accessible to commercial entity subsystem 400, while merchant key 157 may be managed by commercial entity subsystem 400 and/or merchant subsystem 200, such that each of these keys may be maintained and/or updated and/or deleted as needed to maintain their effectiveness. Therefore, merchant key 157 may never be stored on or otherwise accessible to device 100. For example, merchant key 157 may not even be stored on a secure element of device 100. Merchant key 157 can be revocable or may expire after a certain amount of time, which may require merchant subsystem 200 and commercial entity subsystem 350 to communicate every so often to manage and/or update merchant key 157. This may enable commercial entity subsystem 400 to dictate which merchant subsystems 200 may be able to conduct online transactions using secure credentials of device 100. Moreover, certain access information (e.g., 155a, 155b, 156k, 151k, and/or 158k) may never be stored on or otherwise accessible to merchant subsystem 200. For example, certain access information can be revocable or may expire after a certain amount of time, which may require device 100 and commercial entity subsystem 400 to communicate every so often to manage and/or update such access information. This may enable commercial entity subsystem 400 to dictate which devices 100 may be able to conduct online transactions using secure credentials of device 100 with a merchant subsystem 200 via commercial entity subsystem 400.

Therefore, process 600 may enable at least one credential provisioned on a secure element of device 100 to be securely used for an online payment transaction with merchant subsystem 200. Process 600 may be configured to provide a virtualized tunnel between the secure element of device 100 and merchant subsystem 200 that may transport a highly secure, EMV ("Europay, MasterCard, Visa") standard-level (e.g., "Chip and PIN") data set of credential data for use in a financial transaction. By only trusting data within the secure element of device 100 and not any data or components of device 100 off of such a secure element (e.g., processor 102 or application 113 local to device 100), process 600 may require that any credential data transmitted out of the secure element (e.g., SE credential data 661 of applet 153a) be encrypted with a credential key 155a' that may only be known by the secure element and financial institution subsystem 350 (e.g., as encrypted SE credential data 662 at step 612), and, in some embodiments, then encrypted with access information (e.g., 155a, 155b, 156k, 151k, and/or 158k) that may only be known by secure element 145 and commercial entity subsystem 400 (e.g., as encrypted commercial entity credential data 663 at step 613). Commercial entity subsystem 400 may then leverage this data 663 (e.g., as part of received commercial entity transaction data 664) and its knowledge of such access information (e.g., 155a, 155b, 156k, 151k, and/or 158k) and merchant key 157 to decrypt/re-encrypt (e.g., at steps 616/617) the credential data transmitted by device 100 for later use by merchant subsystem 200. By providing commercial entity subsystem 400 in the middle of process 600, an extra layer of security is realized. Commercial entity subsystem 400 may be privy not only to certain access information (e.g., 155a, 155b, 156k, 151k, and/or 158k) shared by secure element 145 of device 100 but also to merchant key 157 shared by merchant subsystem 200. Therefore, commercial entity subsystem 400 may be in a unique position to manage any online transactions between the secure element of device 100 and merchant subsystem 200, while at the same time not being privy to the credential data being used (e.g., not being privy to SE credential data 661 of applet 153a that may be encrypted as encrypted SE credential data 662 at step 612 by credential key 155a', for example, because commercial entity subsystem 400 may not have access to credential key 155a').

Commercial entity subsystem 400 may be configured to provide a validation check after receiving commercial entity transaction data 664 but before providing merchant transaction data 668 (e.g., at steps 616-618/621). For example, commercial entity subsystem 400 may determine that received commercial entity transaction data 664 identifies a merchant whose merchant key 157 has expired or has otherwise been terminated or not recognized (e.g., by table 430). Therefore, if commercial entity subsystem 400 at some point before step 618/621 determines that a particular merchant is no longer trustworthy, commercial entity subsystem 400 may remove or otherwise disable its merchant key 157 from table 430, such that, when a merchant associated with that key 157 is later identified by commercial entity subsystem 400 from a received commercial entity transaction data 664 provided by an electronic device 100, commercial entity subsystem 400 may not provide any associated merchant transaction data 668/671, thereby preventing the desired financial transaction. Alternatively, a merchant identified in commercial entity transaction data 664 received from an electronic device 100 may never have had a merchant key 157 associated with table 430, such that commercial entity subsystem 400 may realize that commercial entity transaction data 664 may be an attempt to conduct a financial transaction with a merchant that is not recognized by commercial entity subsystem 400 and, thus, commercial entity subsystem 400 may prevent the transaction from being carried out. However, if process 600 is able to be completed, not only may commercial entity subsystem 400 be satisfied that the financial transaction is between a known device 100 (e.g., due to shared access information (e.g., 155a, 155b, 156k, 151k, and/or 158k)) and a known merchant subsystem 200 (e.g., due to a known merchant key 157), but merchant subsystem 200 may also be satisfied that the financial transaction is being conducted with a trusted device 100 (e.g., due to the received communication data 670/671 being encrypted with a merchant key 157 from a trusted commercial entity subsystem 400).

It is understood that the steps shown in process 600 of FIG. 6 are merely illustrative and that existing steps may be modified or omitted, additional steps may be added, and the order of certain steps may be altered. For example, it is to be understood that some shared keys may be public keys while other shared keys may be private or secret keys (e.g., a mathematically linked key pair that includes a public key and a private key). A public key of a key pair may be used to encrypt data while a private key of that key pair may be used to decrypt the encrypted data. For example, access key 155a of SSD 154a and/or access key 155b of SSD 154b, which may be stored in secure element 145 of device 100, may be a public key while access key 155a and/or access key 155b available at commercial entity subsystem 400 may be an associated private key or vice versa. Additionally or alternatively, ISD key 156k of ISD 152 that may be stored in a secure element of device 100 may be a public key while ISD key 156k available at commercial entity subsystem 400 may be an associated private key or vice versa. Additionally or alternatively, CRS 151k that may be stored in a secure element of device 100 may be a public key while CRS 151k available at commercial entity subsystem 400 may be an associated private key or vice versa. Additionally or alternatively, CASD 158k that may be stored in a secure element of device 100 may be public while CASD 158k available at commercial entity subsystem 400 may be private or vice versa. Additionally or alternatively, merchant key 157 of table 430 or elsewhere at commercial entity subsystem 400 may be a public key while merchant key 157 available at merchant subsystem 200 may be an associated private key or vice versa. Moreover, certain data may be signed by a component transmitting that data. For example, commercial entity transaction data 664 may be signed by device 100 before being transmitted to commercial entity subsystem 400 at step 614 or encrypted commercial entity credential data 663 may be signed by the secure element at step 613 (e.g., by CASD 158k) before being transmitted as at least a portion of transaction data 664 at step 614. Such a signature by device 100 may enable commercial entity subsystem 400 to more confidently determine that data 664 was generated by a trusted device 100. Additionally or alternatively, data 668 may be signed by commercial entity subsystem 400 before being transmitted to device 100 at step 618 and/or before being transmitted to merchant subsystem 200 at step 621. Such a signature by commercial entity subsystem 400 may enable device 100 and/or merchant subsystem 200 to more confidently determine that data 668/670/671 was generated by a trusted commercial entity subsystem 400. It is to be understood that device 100 need not be configured to handle NFC communications or any other contactless proximity-based communications with another device (e.g., an NFC communication with a merchant terminal of merchant subsystem 200). Instead, device 100 may include a secure element for storing credential information that may be used for online transactions, as described with respect to process 600, while not being leveraged for NFC transactions. For example, device 100 may include a secure element (e.g., with controller module 140 and/or memory module 150, without device module 130).

Description of FIG. 7

FIG. 7 is a flowchart of an illustrative process 700 for recommending payment credentials. At step 702 of process 700, merchant context data may be accessed by an electronic device. For example, as described above with respect to step 502 of process 500 and/or step 606 of process 600, any suitable merchant context data may be accessed by electronic device 100 (e.g., from merchant subsystem 200 and/or subsystem 170). Next, at step 704 of process 700, it may be determined whether the current settings of the electronic device are configured to allow for payment recommendation data to be generated based on merchant context data. If the current setting are determined not to allow for payment recommendation data to be generated based on merchant context data at step 704, process 700 may advance to step 706 where payment recommendation data may be presented by the electronic device that prioritizes a first credential based on the current settings of the electronic device. However, if the current setting are determined to allow for payment recommendation data to be generated based on merchant context data at step 704, process 700 may advance to step 708 where payment recommendation data may be presented by the electronic device that prioritizes a second credential based on the merchant context data. For example, as described above with respect to step 605 of process 600, a user may define one or more user settings that may be operative to at least partially define a priority amongst credentials on device 100 (e.g., at least a default credential to be prioritized), and then, at step 611, merchant context data may be processed in combination with such user settings to determine whether or not a user defined priority of one or more payment credentials may be altered due to merchant context data.

It is understood that the steps shown in process 700 of FIG. 7 are merely illustrative and that existing steps may be modified or omitted, additional steps may be added, and the order of certain steps may be altered.

Description of FIG. 8

FIG. 8 is a flowchart of an illustrative process 800 for recommending payment credentials. At step 802 of process 800, credential availability data indicative of at least one payment credential may be accessed. For example, as described above with respect to FIGS. 4-6, secure element 145 may include at least one payment credential stored thereon, and electronic device 100 (e.g., processor 102) may be operative to access credential availability data that may be indicative of the payment credential(s) stored on secure element 145. At step 804 of process 800, merchant context data associated with a merchant subsystem may be accessed, where the merchant context data may be indicative of a preference for a first type of payment credential over a second type of payment credential. For example, as described above with respect to step 502 of process 500 and/or step 606 of process 600, any suitable merchant context data may be accessed by electronic device 100 (e.g., from merchant subsystem 200 and/or subsystem 170) that may be indicative of a preference or priority of one type of payment credential over another (e.g., credential Y over credential X). Then, at step 806 of process 800, payment recommendation data based on the accessed credential availability data and the accessed merchant context data may be presented. For example, as described above with respect to step 611 of process 600, electronic device 100 may be operative to present payment recommendation data based on the processing of merchant context data and the availability of one or more credentials on secure element 145.

It is understood that the steps shown in process 800 of FIG. 8 are merely illustrative and that existing steps may be modified or omitted, additional steps may be added, and the order of certain steps may be altered.

Further Description of FIG. 1, FIG. 1A, FIG. 2.
FIG. 3, and FIG. 4

Although not shown, commercial entity subsystem 400 of FIG. 1A may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out operations on device 100 in concert with financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1A and/or electronic device 100 via communications path 65 of FIG. 1A).

When a credential of a secure element of device 100 is appropriately enabled (e.g., commerce credential data associated with an enabled applet 153a of credential SSD 154a of NFC component 120) so as to be provided as a commerce credential data communication to merchant subsystem 200 (e.g., as a contactless proximity-based communication to a merchant terminal and/or as an online-based communication 670 to a merchant server 210), acquiring bank subsystem 300 may utilize such a commerce credential data communication for completing a financial transaction with financial institution subsystem 350. For example, after a user of electronic device 100 has chosen a product for purchase and has appropriately enabled a specific credential of device 100 to be used for payment, merchant subsystem 200 may receive an appropriate commerce credential data communication indicative of commerce credential data for the specific credential. Merchant server 210 and/or merchant terminal 220 may be provided by any suitable merchant or merchant agent of merchant subsystem 200 that may provide a product or service to a user of device 100 in response to device 100 providing payment credentials via such a commerce credential data communication. Based on such a received commerce credential data communication (e.g., communication 5/670), merchant subsystem 200 may be configured to generate and transmit data 673 to acquiring bank subsystem 300 (e.g., via a communication path 25 between merchant subsystem 200 and acquiring bank subsystem 300), where data 673 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via a commerce credential data communication (e.g., via a contactless proximity-based communication and/or via an online-based communication 670) with merchant subsystem 200. Acquiring bank subsystem 300 may then forward the authorization request from data 673 to financial institution subsystem 350 as data 674 (e.g., via a communication path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Financial institution subsystem 350 may also include one or more acquiring banks, such as acquiring bank subsystem 300. For example, acquiring bank subsystem 300 may be the same entity as issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of payment network subsystem 360 and issuing bank subsystem 370 being separate entities, payment network subsystem 360 may receive the authorization request of data 674 from acquiring bank subsystem 300 and may then forward the request to issuing bank subsystem 370 as data 405 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 674 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 674 or indirectly via payment network subsystem 360 as data 405), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 676 (e.g., authorization response data 676 may be provided directly from issuing bank subsystem 370 to acquiring bank subsystem 300 via communication path 35, or authorization response data 676 may be provided from payment network subsystem 360 to acquiring bank subsystem 300 based on authorization response data 415 that may be provided to payment network subsystem 360 from issuing bank subsystem 370 via communication path 45).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), one or more sensors that may be operative to configure device 100 as any suitable location-aware device of a location-based service ("LBS") and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1A), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., a merchant terminal of merchant subsystem 200).

NFC component 120 may include any suitable modules for enabling contactless proximity-based communication between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 5. Additionally or alternatively, NFC data module 132 may be configured to contain, route, or otherwise receive any suitable data that may be received by NFC component 120 from merchant subsystem 200 as part of a contactless proximity-based communication 5.

NFC transceiver or NFC antenna 134 may be any suitable antenna or other suitable transceiver circuitry that may generally enable communication of communication from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication to subsystem 200. For example, shared antenna 116 may require amplification from booster 136 before antenna 116 (e.g., a non-loop antenna) may be properly enabled for communicating contactless proximity-based or NFC communication between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 5) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa) may be the TSM for first SSD 154a and applet 153a of first SSD 154a may be associated with a commerce credential manaued by that first payment network subsystem 360, while a second payment network subsystem 360 (e.g., MasterCard) may be the TSM for another SSD 154.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

A merchant terminal of merchant subsystem 200 of FIG. 1A may include a reader for detecting, reading, or otherwise receiving an NFC communication from electronic device 100 (e.g., when electronic device 100 comes within a certain distance or proximity of such a merchant terminal). Accordingly, it is noted that an NFC communication between such a merchant terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a merchant terminal. For instance, a reader of such a merchant terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to such a merchant terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to such a merchant terminal as an NFC communication, rather than reflect radio frequency signals, as in the case of a passive NFC device module 130. A merchant terminal may be provided by a merchant of merchant subsystem 200 (e. LY in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication between electronic device 100 and such a merchant terminal. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 4, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Merchant App" textual indicator 181 (i.e., specific icon 183) is selected, device 100 may launch or otherwise access a specific merchant application and may display screens of a specific user interface that may include one or more tools or features for interacting with device 100 in a specific manner. For each application, screens may be displayed on display output component 112a and may include various user interface elements (e.g., screens 190-190c of FIGS. 4-4C). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 4, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 4). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 1100 may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112a). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112a) with graphical data to display a graphical user interface ("GUI") 180. GUI 180 may be configured to receive touch input via a touch input component 110f. Embodied as a touch screen (e.g., with display output component 112a as I/O component 114a), touch I/O component 110f may display GUI 180. Alternatively, GUI 180 may be displayed on a display (e.g., display output component 112a) separate from touch input component 110f. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for recommending payment credentials, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
at an electronic device comprising a memory, a separate secure element that comprises at least one payment credential, a communication component, and a near-field communication antenna:
accessing credential availability data indicative of the at least one payment credential;
receiving, responsive to the electronic device being located within a particular distance of a beacon device associated with a merchant subsystem and via a broadcast message from the beacon device associated with the merchant subsystem, merchant context data associated with the merchant subsystem, wherein the merchant context data is indicative of a merchant subsystem preference that the merchant subsystem has for a first type of payment credential accepted by the merchant subsystem over a second type of payment credential accepted by the merchant subsystem, the broadcast message being received via the communication component;
automatically switching, at the electronic device, a default payment credential stored for transactions with a wireless terminal of the merchant subsystem to be the first or second type of payment credential based at least in part on the accessed credential availability data and the received merchant context data;
presenting the default payment credential as a recommended payment credential for a transaction with the wireless terminal of the merchant subsystem;
receiving, at the electronic device and responsive to presenting the default payment credential as the recommended payment credential for the transaction, a user selection of the presented default payment credential;
in response to receiving the user selection, sending, using the secure element and by the near-field communication antenna, the default payment credential to the merchant subsystem; and
storing the default payment credential in the secure element.

2. The method of claim 1, further comprising, at the electronic device, accessing user preference data, wherein automatically switching comprises automatically switching further based at least in part on the accessed credential availability data, the received merchant context data, and the accessed user preference data.

3. The method of claim 1, wherein the merchant context data is received via an online merchant application running on the electronic device.

4. The method of claim 1, wherein the merchant context data is received by the electronic device directly from the merchant subsystem.

5. The method of claim 1, wherein:
the at least one payment credential comprises the first type of payment credential and the second type of payment credential; and
the presented default payment credential comprises information recommending use of the first type of payment credential ahead of the second type of payment credential.

6. The method of claim 1, wherein:
the at least one payment credential comprises the first type of payment credential and the second type of payment credential; and
the presented default payment credential comprises information indicative of the first type of payment credential but not the second type of payment credential.

7. The method of claim 1, wherein:
the at least one payment credential comprises the first type of payment credential, the second type of payment credential, and a third type of payment credential; and
the presented default payment credential comprises information indicative of the first type of payment credential but not the third type of payment credential.

8. The method of claim 1, wherein:
the at least one payment credential comprises the first type of payment credential but not the second type of payment credential; and
the presented default payment credential comprises information indicative of the first type of payment credential and information indicative of the second type of payment credential.

9. The method of claim 1, wherein the presented default payment credential comprises information describing a benefit of using the first type of payment credential.

10. A device comprising:
a memory;
a secure element, separate from the memory, that comprises at least one payment credential;
a communication component;
a near-field communication antenna; and
at least one processor configured to:
receive, responsive to the device being located within a particular distance of a beacon device associated with a merchant subsystem, via a broadcast message from the beacon device associated with the merchant subsystem, and via the communication component, merchant context data associated with the merchant subsystem, wherein the merchant context data is indicative of a merchant subsystem preference that the merchant subsystem has for a first type of payment credential over a second type of payment credential, the first and second types of payment credentials both being accepted by the merchant subsystem;
access credential availability data indicative of the at least one payment credential;
automatically switch, at the device, a default payment credential stored for transactions with a wireless terminal of the merchant subsystem to be the first or second type of payment credential based at least in part on the accessed credential availability data and the received merchant context data;
present the default payment credential as a recommended payment credential for a transaction with the wireless terminal of the merchant subsystem;
receive, responsive to presentation of the default payment credential as the recommended payment credential for the transaction, a user selection of the default payment credential;
in response to receipt of the user selection, send, using the secure element and by the near-field communication antenna, the default payment credential to the merchant subsystem; and
store the default payment credential in the secure element.

11. The device of claim 10, wherein the at least one processor is further configured to:
access user preference data; and
automatically switch further based at least in part on the accessed credential availability data, the received merchant context data, and the accessed user preference data.

12. The device of claim 10, wherein:
the at least one payment credential comprises the first type of payment credential and the second type of payment credential; and
the presented default payment credential comprises information recommending use of the first type of payment credential ahead of the second type of payment credential.

13. The device of claim 10, wherein:
the at least one payment credential comprises the first type of payment credential and the second type of payment credential; and
the presented default payment credential comprises information indicative of the first type of payment credential but not the second type of payment credential.

14. The device of claim 10, wherein:
the at least one payment credential comprises the first type of payment credential, the second type of payment credential, and a third type of payment credential; and
the presented default payment credential comprises information indicative of the first type of payment credential but not the third type of payment credential.

15. The device of claim 10, wherein:
the at least one payment credential comprises the first type of payment credential but not the second type of payment credential; and
the presented default payment credential comprises information indicative of the first type of payment credential and information indicative of the second type of payment credential.

16. The device of claim 10, wherein the at least one processor is configured to receive the merchant context data directly from the merchant subsystem.

17. The device of claim 10, wherein the merchant context data is received via an online merchant application running on the device.

18. The device of claim 10, wherein the presented default payment credential comprises information describing a benefit of using the first type of payment credential.

19. A non-transitory computer-readable medium comprising computer-readable instructions recorded thereon which, when executed by one or more processors of an electronic device comprising: a memory, a separate secure element that comprises at least one payment credential, a communication component, and a near-field communication antenna, causes the one or more processors to perform operations comprising:
receiving, responsive to the electronic device being located within a particular distance of a beacon device associated with a merchant subsystem, via a broadcast message from the beacon device associated with the merchant subsystem, and via the communication component, merchant context data associated with the merchant subsystem, wherein the merchant context data is indicative of a merchant subsystem preference that the merchant subsystem has for a first type of payment credential that is accepted by the merchant subsystem over a second type of payment credential that is accepted by the merchant subsystem;

accessing credential availability data indicative of the at least one payment credential;

automatically switching, at the electronic device, a default payment credential stored for transactions with a wireless terminal of the merchant subsystem to be the first or second type of payment credential based at least in part on the accessed credential availability data and the received merchant context data, the wireless terminal being separate from the beacon device;

presenting the default payment credential as a recommended payment credential for a transaction with the wireless terminal of the merchant subsystem;

receiving, at the electronic device and responsive to presenting the default payment credential as the recommended payment credential for the transaction, a user selection of the presented default payment credential;

in response to receiving the user selection, sending, using the secure element and by the near-field communication antenna, the default payment credential to the merchant subsystem; and storing the default payment credential in the secure element.

20. The method of claim 1, wherein automatically switching, at the electronic device, the default payment credential for the transaction with the merchant subsystem to be the first or second type of payment credential based at least in part on the accessed credential availability data and the received merchant context data further comprises:

determining, based at least in part on the received merchant context data, that the first type of payment credential is preferred by the merchant subsystem;

determining, based at least in part on the accessed credential availability data, that the default payment credential stored for the transactions with the merchant subsystem corresponds to the second type of payment credential; and responsive to determining that the stored default payment credential corresponds to the second type of payment credential, automatically switching the default payment credential for the transaction with the merchant subsystem to be the first type of payment credential.

21. The method of claim 1, wherein receiving, responsive to the electronic device being located within the particular distance of the beacon device associated with the merchant subsystem and via the broadcast message from the beacon device associated with the merchant subsystem, merchant context data associated with the merchant subsystem further comprises:

receiving, responsive to the electronic device being located within the particular distance of the beacon device associated with the merchant subsystem, the beacon device being separate from the wireless terminal and physically co-located with the wireless terminal in a same physical location associated with the merchant subsystem, and via the broadcast message from the beacon device associated with the merchant subsystem, merchant context data associated with the merchant subsystem.

* * * * *